(12) United States Patent
Feng et al.

(10) Patent No.: US 11,321,410 B2
(45) Date of Patent: May 3, 2022

(54) INFORMATION RECOMMENDATION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Zhe Feng, Shenzhen (CN); Zhiping Wang, Shenzhen (CN); Leyu Lin, Shenzhen (CN); Ge Wang, Shenzhen (CN); Yang Cui, Shenzhen (CN); Jiayi Ding, Shenzhen (CN); Shuo Wang, Shenzhen (CN); Qihao Zhu, Shenzhen (CN); Chenglin Zhong, Shenzhen (CN); Shanpeng Sun, Shenzhen (CN); Xiumin Lin, Shenzhen (CN); Yang Zuo, Shenzhen (CN); Junhong Yan, Shenzhen (CN); Ming Zou, Shenzhen (CN); Xulin Liao, Shenzhen (CN); Feng Xia, Shenzhen (CN); Xu Zhang, Shenzhen (CN); Su Yan, Shenzhen (CN); Wei Wang, Shenzhen (CN); Zhiwei Guo, Shenzhen (CN); Jianxiong Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/235,922

(22) Filed: Apr. 20, 2021

(65) Prior Publication Data

US 2021/0240792 A1    Aug. 5, 2021

Related U.S. Application Data

(63) Continuation of application No. PCT/CN2019/126185, filed on Dec. 18, 2019.

(30) Foreign Application Priority Data

Dec. 18, 2018    (CN) .......................... 201811550226.3

(51) Int. Cl.
G06F 16/9536    (2019.01)
G06F 16/9535    (2019.01)
(Continued)

(52) U.S. Cl.
CPC ........ *G06F 16/9536* (2019.01); *G06F 3/0483* (2013.01); *G06F 3/0484* (2013.01);
(Continued)

(58) Field of Classification Search
CPC ...... G06F 3/0483–0484; G06F 16/9535–9536; H04L 51/32; H04L 67/26
See application file for complete search history.

(56) References Cited

U.S. PATENT DOCUMENTS 8,091,032 B2 * 1/2012 Fischer ................... H04L 51/32
715/751
9,167,046 B2 * 10/2015 Murarka ................. H04L 51/32
(Continued)

FOREIGN PATENT DOCUMENTS

CN    104301207 A    1/2015
CN    104520887 A    4/2015
(Continued)

OTHER PUBLICATIONS

Nava Tintarev and Judith Masthoff, "A Survey of Explanations in Recommender Systems", published on Apr. 1, 2007 for the 2007 IEEE 23rd International Conference on Data Engineering Workshop, pp. 801-810, retrieved Jan. 19, 2022. (Year: 2007).*

(Continued)

*Primary Examiner* — Shourjo Dasgupta
(74) *Attorney, Agent, or Firm* — Anova Law Group, PLLC

(57) ABSTRACT

This application discloses an information recommendation method and apparatus, a device, and a storage medium, and belongs to the field of information recommendation. The method includes starting an application program according to a start operation, a first account being logged in in the application program; obtaining a recommended information flow for the first account, recommended information in the recommended information flow including at least one piece of interactive recommended information, the interactive recommended information being information for which a second account generates an interactive message, the first account and the second account having a social relationship; and displaying an information presentation interface, the (Continued)

information presentation interface comprising the recommended information displayed in an information flow form.

20 Claims, 23 Drawing Sheets

(51) Int. Cl.
*G06F 3/0483* (2013.01)
*G06F 3/0484* (2022.01)
*H04L 51/52* (2022.01)
*H04L 67/55* (2022.01)

(52) U.S. Cl.
CPC .......... *G06F 16/9535* (2019.01); *H04L 51/32* (2013.01); *H04L 67/26* (2013.01)

(56) References Cited

U.S. PATENT DOCUMENTS

| | | | | |
|---|---|---|---|---|
| 9,185,062 | B1* | 11/2015 | Yang | G06F 1/1694 |
| 9,747,374 | B2* | 8/2017 | Howes | G06F 16/9535 |
| 10,762,153 | B2* | 9/2020 | Puri | G06F 16/9535 |
| 2003/0106058 | A1* | 6/2003 | Zimmerman | H04N 21/4532 |
| | | | | 725/46 |
| 2009/0006398 | A1* | 1/2009 | Lam | G06Q 30/02 |
| 2009/0234876 | A1* | 9/2009 | Schigel | H04L 51/02 |
| 2009/0327972 | A1* | 12/2009 | McCann | G06Q 10/107 |
| | | | | 715/853 |
| 2010/0042460 | A1* | 2/2010 | Kane, Jr. | G06Q 30/02 |
| | | | | 705/14.69 |
| 2010/0042608 | A1* | 2/2010 | Kane, Jr. | G06F 16/9535 |
| | | | | 707/732 |
| 2011/0066507 | A1 | 3/2011 | Iyer et al. | |
| 2011/0225197 | A1* | 9/2011 | Howes | G06F 16/93 |
| | | | | 707/780 |
| 2012/0173626 | A1* | 7/2012 | Reis | G06Q 30/0277 |
| | | | | 709/204 |
| 2013/0066819 | A1* | 3/2013 | Nice | G06Q 30/0255 |
| | | | | 706/14 |
| 2013/0262574 | A1* | 10/2013 | Cohen | H04L 51/18 |
| | | | | 709/204 |
| 2014/0152666 | A1* | 6/2014 | Deng | H04L 51/32 |
| | | | | 345/440 |
| 2014/0181053 | A1* | 6/2014 | Belanger | G06F 16/176 |
| | | | | 707/687 |
| 2015/0032688 | A1* | 1/2015 | Dayon | G06F 16/951 |
| | | | | 707/609 |
| 2015/0134476 | A1 | 5/2015 | Barbieri et al. | |
| 2015/0286937 | A1* | 10/2015 | Hildebrand | H04L 12/1859 |
| | | | | 706/11 |
| 2015/0302338 | A1* | 10/2015 | Zaveri | H04L 67/10 |
| | | | | 705/7.39 |
| 2016/0247213 | A1* | 8/2016 | Lee | G06Q 30/0617 |
| 2017/0046024 | A1* | 2/2017 | Dascola | G06F 3/04845 |
| 2017/0148086 | A1* | 5/2017 | Harkins | G06Q 30/0635 |
| 2017/0180294 | A1* | 6/2017 | Milligan | H04L 51/02 |
| 2017/0310533 | A1* | 10/2017 | Liu | H04L 51/10 |
| 2018/0367478 | A1* | 12/2018 | Desjardins | H04L 51/04 |
| 2018/0367483 | A1* | 12/2018 | Rodriguez | H04L 65/60 |
| 2018/0367484 | A1* | 12/2018 | Rodriguez | G06Q 10/101 |
| 2019/0163829 | A1* | 5/2019 | Puri | G06F 16/9536 |
| 2020/0364280 | A1* | 11/2020 | Puri | G06Q 30/02 |

FOREIGN PATENT DOCUMENTS

| | | |
|---|---|---|
| CN | 104967679 A | 10/2015 |
| CN | 108933726 A | 12/2018 |
| CN | 110209952 A | 9/2019 |

OTHER PUBLICATIONS

Aurora Harley, "Individualized Recommendations: Users' Expectations & Assumptions", published on Sep. 30, 2018 at https://www.nngroup.com/articles/recommendation-expectations, retrieved Jan. 19, 2022. (Year: 2018).*

Xiting Wang and Yiru Chen and Jie Yang and Le Wu and Zhengtao Wu and Xing Xie, "A Reinforcement Learning Framework for Explainable Recommendation", published on Nov. 1, 2018 for the 2018 IEEE International Conference on Data Mining (ICDM), pp. 587-596, retrieved Jan. 19, 2022. (Year: 2018).*

Panagiotis Symeonidis and Alexandros Nanapoulos and Yannis Manalopoulos, "Providing Justifications in Recommender Systems", published in Nov. 2008 for IEEE Transactions on Systems, Man, and Cybernetics—Part A: Systems and Humans, vol. 38, No. 6, retrieved Jan. 19, 2022. (Year: 2008).*

The World Intellectual Property Organization (WIPO) International Search Report for PCT/CN2019/126185 dated Mar. 24, 2020 6 Pages (including translation).

* cited by examiner

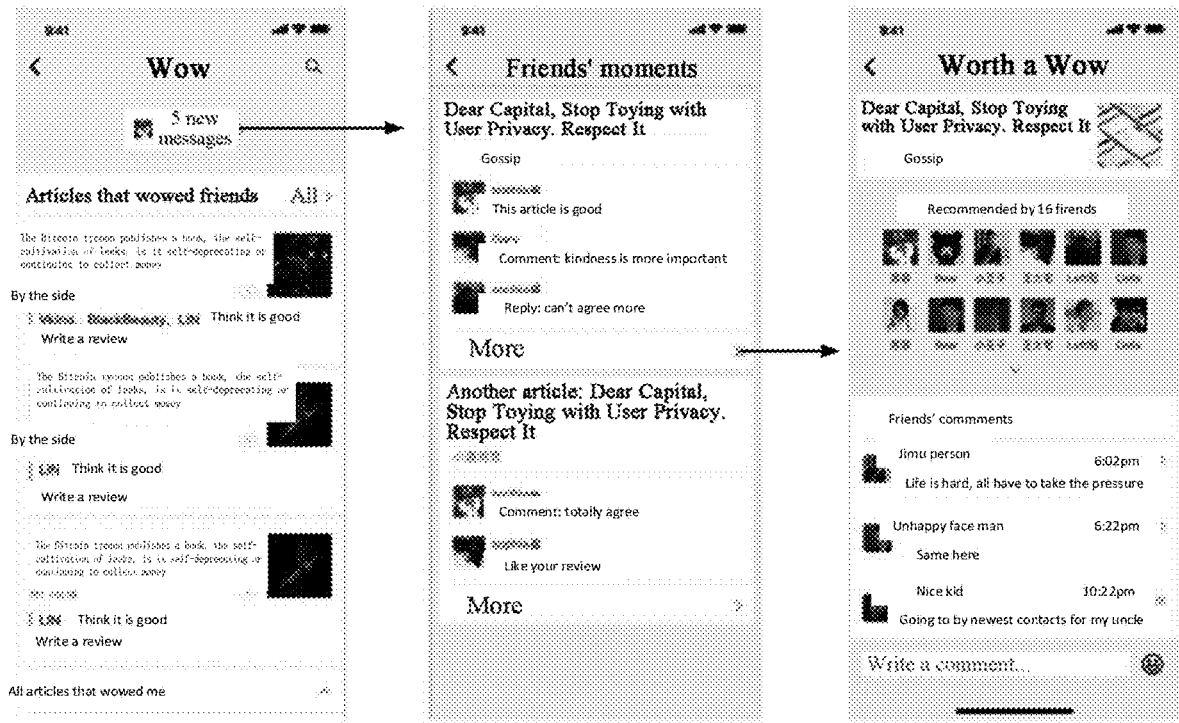

FIG. 15

```
┌─────────────────────────────────────────────────────────┐
│ Display, in a case that a quantity of pieces of second  │
│ recommended information exceeds a preset quantity,      │──215
│ target second recommended information whose quantity    │
│ of pieces exceeds the preset quantity in the collapsed  │
│ display state in the information presentation interface │
└─────────────────────────────────────────────────────────┘
                            │
                            ▼
┌─────────────────────────────────────────────────────────┐
│ Switch the target second recommended information from   │
│ the collapsed display state to an expanded display      │──216
│ state in the information display interface in a case    │
│ that an expansion signal for the target second          │
│ recommended information is received                     │
└─────────────────────────────────────────────────────────┘
```

FIG. 16

INFORMATION RECOMMENDATION METHOD AND APPARATUS, DEVICE, AND STORAGE MEDIUM

RELATED APPLICATION

This application is a continuation of PCT Application No. PCT/CN2019/126185, filed on Dec. 18, 2019, which in turn claims priority to Chinese Patent Application No. 201811550226.3, entitled "INFORMATION RECOMMENDATION METHOD AND APPARATUS, DEVICE, AND STORAGE MEDIUM" and filed with the National Intellectual Property Administration, PRC on Dec. 18, 2018. The two applications are incorporated herein by reference in their entirety.

FIELD OF THE TECHNOLOGY

This application relates to the field of information recommendation, and in particular, to an information recommendation method and apparatus, a device, and a storage medium.

BACKGROUND OF THE DISCLOSURE

In an application program such as a reading application or a news application, a server recommends to a user a variety of information in which the user may be interested.

In the related art, when a user uses an application program, a server collects articles read, liked, and commented on by a terminal in a historical time period to generate a user profile. The user profile includes tags in which the user is interested, for example, cars, food, and science and technology. Next, the server selects a plurality of pieces of recommended information from an information pool and a probability of interest corresponding to each recommended information based on the user profile, and recommends the recommended information to the terminal in descending order of probability of interest. The terminal displays the plurality of pieces of recommended information in descending order of probability of interest.

The information recommendation method depends on the accuracy of a user profile. When a user is interested in a small quantity of tags or tags in which a user is interested are inaccurate, the accuracy of recommending to a user information in which the user may be interested is relatively low.

SUMMARY

According to various embodiments provided in this application, an information recommendation method and apparatus, a device, and a storage medium are provided.

One aspect of this application provides an information recommendation method. The method includes starting an application program according to a start operation, a first account being logged in in the application program; obtaining a recommended information flow for the first account, recommended information in the recommended information flow including at least one piece of interactive recommended information, the interactive recommended information being information for which a second account generates an interactive message, the first account and the second account having a social relationship; and displaying an information presentation interface, the information presentation interface comprising the recommended information displayed in an information flow form.

Another aspect of this application provides an information recommendation method, performed by a server. The method includes receiving interactive messages generated by accounts corresponding to information; determining a second account having a social relationship with a first account; generating at least one piece of interactive recommended information for the first account according to the information for which the second account generates the interactive message; and transmitting a recommended information flow for the first account to a first terminal, recommended information in the recommended information flow including the at least one piece of interactive recommended information.

Another aspect of this application provides a terminal. The terminal includes a memory and a processor, the memory storing computer-readable instructions, the computer-readable instructions, when executed by the processor, causing the processor to perform the information recommendation method, including the steps of starting an application program according to a start operation, a first account being logged in in the application program; obtaining a recommended information flow for the first account, recommended information in the recommended information flow including at least one piece of interactive recommended information, the interactive recommended information being information for which a second account generates an interactive message, the first account and the second account having a social relationship; and displaying an information presentation interface, the information presentation interface comprising the recommended information displayed in an information flow form.

According to an aspect, one or more non-transitory storage media storing computer-readable instructions are provided, the computer-readable instructions, when executed by one or more processors, causing the one or more processors to perform a plurality of operations. The operations include: starting an application program according to a start operation, a first account being logged in in the application program; obtaining a recommended information flow for the first account, recommended information in the recommended information flow including at least one piece of interactive recommended information, the interactive recommended information being information for which a second account generates an interactive message, the first account and the second account having a social relationship; and displaying an information presentation interface, the information presentation interface comprising the recommended information displayed in an information flow form.

Details of one or more embodiments of this application are provided in the following accompanying drawings and descriptions. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 15 is a schematic diagram of an interface of an information recommendation method according to an exemplary embodiment of this application.

FIG. 16 is a flowchart of an information recommendation method according to an exemplary embodiment of this application.

Figure 1:
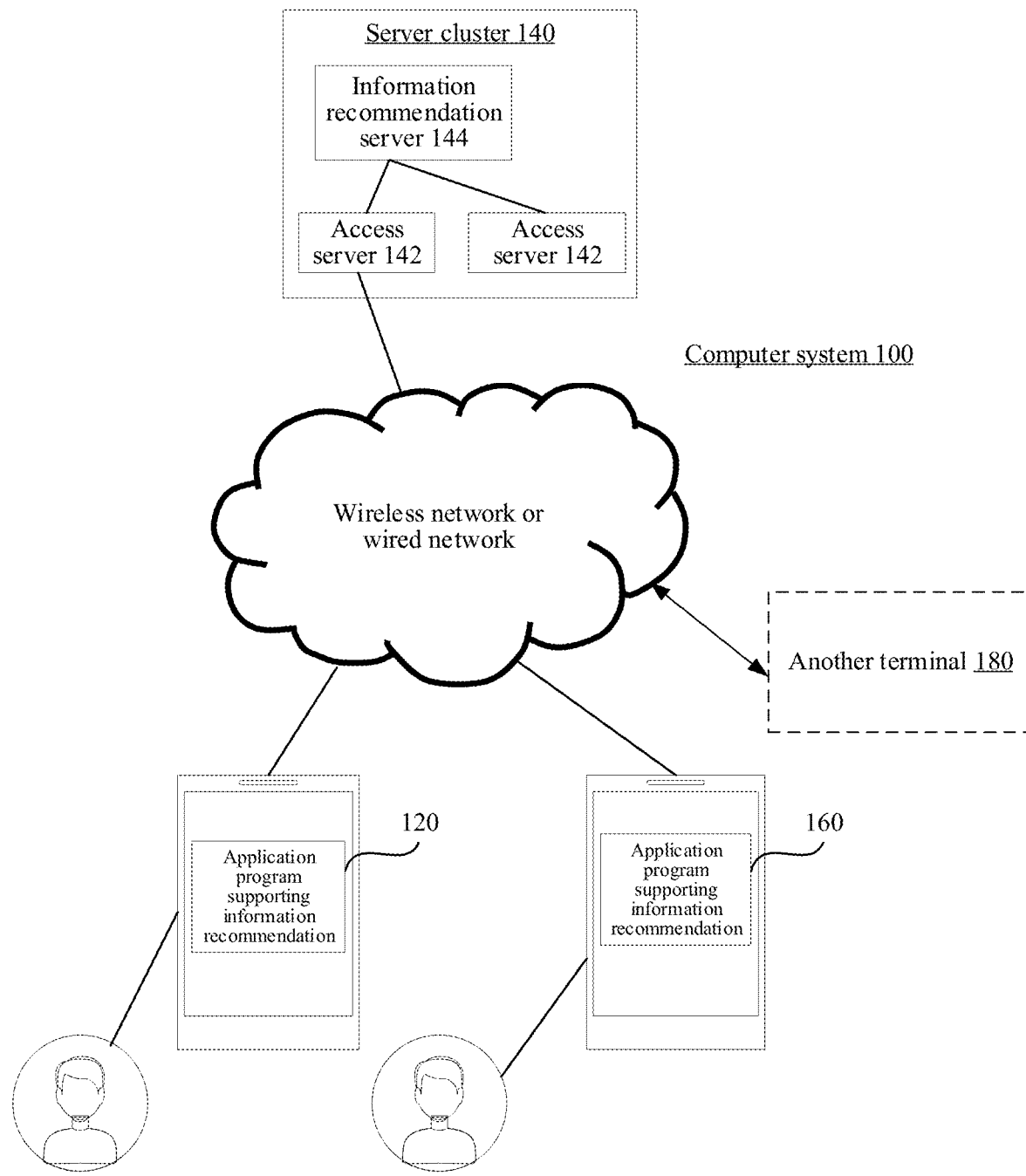
FIG. 1 is a block diagram of a computer system according to an exemplary embodiment of this application.

Any name, commodity name, program name, nickname, and article name in the accompanying drawings in this specification are exemplary examples for description, and does not represent a character or a commodity in any real world.

DESCRIPTION OF EMBODIMENTS

To make the objectives, technical solutions, and advantages of this application clearer, the following further describes the implementations of this application in detail with reference to the accompanying drawings.

First, the following explains several terms involved in the embodiments of this application.

Information: an information set expressed by using at least one of a text, a picture, audio or a video. In the embodiments of this application, an example in which information is an article is used for description.

A platform having a social attribute is a network architecture that connects people through at least one of social relationships and/or common interests. A user may perform daily communication and process some daily transactions by using a client provided by the platform. Each user may have a network identity (for example, an account) for identification by another user on the platform.

A social relationship chain is an association relationship in which different accounts on the platform having a social attribute exchange information. The social relationship chain includes, but is not limited to, a friend group or a follower group.

The friend relationship chain includes a two-way information exchange relationship between two user accounts on the platform having a social attribute. For example, after a user account A and a user account B establish a friend relationship, the user account A may transmit a message to the user account B, and the user account B may also transmit a message to the user account A. In another example, after the user account A and the user account B establish the friend relationship, original information, a like message, a forward message, a comment message, and a reply message posted by the user account A are visible to the user account B, and original information, a like message, a forward message, a comment message, and a reply message posted by the user account B are visible to the user account A. The two user accounts may respectively correspond to two users in the real world. On the platform having a social attribute, different user accounts may establish a friend relationship in a manner of mutual confirmation, for example, add each other as a friend or follow each other. After two user accounts establish a friend relationship, the user accounts become social network contacts for each other. In addition, a group of user accounts may also form a mutual social relationship by voluntary selection, thereby forming a social group. Each member in the group is a social network contact of all other members in the group.

The follow relationship chain includes a one-way information exchange relationship between a user account and a public social account on the platform having a social attribute. The public social account is a social network entity with a public media attribute, and the public social account may be an account established by an individual or an institution such as a star, a media worker, a merchant, an enterprise, a government or a hospital. The one-way information exchange relationship is formed after a user account follows a public social account. The user account can view, like, comment on, and reply to a comment on information posted by the public social account. Generally, a relationship between the public social account and the user account is a one-to-many relationship.

FIG. 1 is a structural block diagram of a computer system 100 according to an exemplary embodiment of this application. The computer system 100 may be an instant messaging system, a news push system, a shopping system, an online video system, a social application program aggregating people based on topics, channels or circles or another application program system having a social attribute. This is not limited in the embodiments of this application. The computer system 100 includes a first terminal 120, a server cluster 140, and a second terminal 160.

The first terminal 120 is connected to the server cluster 140 by a wireless network or wired network. The first terminal 120 may be at least one of a smartphone, a game console, a desktop computer, a tablet computer, an eBook reader, a moving picture experts group audio layer III (MP3) player, a moving picture experts group audio layer IV (MP4) player, and a portable laptop computer. An application program supporting a social attribute and information recommendation is installed and run on the first terminal 120. The application program may be any one of an instant messaging system, a news push system, a shopping system, an online video system, a social application program aggregating people based on topics, channels or circles or another application program system having a social attribute. The first terminal 120 is a terminal used by a first user, and a first account is logged in in the application program run on the first terminal 120.

The first terminal 120 is connected to the server cluster 140 by a wireless network or wired network.

The server cluster 140 includes at least one of one server, a plurality of servers, a cloud computing platform or a virtualization center. The server cluster 140 is configured to provide a backend service for the application program supporting the information recommendation. In some embodiments, the server cluster 140 takes on primary computing work, and the first terminal 120 and the second terminal 160 take on secondary computing work. Alternatively, the server cluster 140 takes on secondary computing work, and the first terminal 120 and the second terminal 160 take on primary computing work. Alternatively, collaborative computing is performed by using a distributed computing architecture among the server cluster 140, the first terminal 120, and the second terminal 160.

In some embodiments, the server cluster 140 includes an access server 142 and an information recommendation server 144. The access server 142 is configured to provide an access service and an information recommendation service to the first terminal 120 and the second terminal 160, and transmit recommended information (at least one of an article, a picture, audio or a video) from the information recommendation server 144 to the terminal (the first terminal 120 or the second terminal 160). There may be one or more information recommendation servers 144. When there is a plurality of information recommendation servers 144, at least two information recommendation servers 144 are configured to provide different services, or at least two information recommendation servers 144 are configured to provide at least one of the same service, for example, provide the same service in a load balancing manner. This is not limited in the embodiments of this application.

An application program supporting a social attribute and information recommendation is installed and run on the second terminal 160. The application program may be any one of an instant messaging system, a news push system, a shopping system, an online video system, a social application program aggregating people based on topics, channels or circles or another application program system having a social attribute. The second terminal 160 is a terminal used by a second user. A second account is logged in in the application program on the second terminal 160.

In some embodiments, the first account and the second account are in a virtual social network, and the virtual social network includes a social relationship chain between the first account and the second account. The virtual social network may be provided by the same social platform, or may be cooperatively provided by a plurality of social platforms having an association relationship (for example, a login authorization relationship). A specific form of the virtual social network is not limited in the embodiments of this application. In some embodiments, the first account and the second account may belong to the same team or the same organization, and have a friend relationship or have a temporary communication permission. In some embodiments, the first account and the second account may alternatively have a stranger relationship. In a word, the virtual social network provides a one-way message propagation path or a two-way message propagation path between the first account and the second account.

In some embodiments, the application programs installed on the first terminal 120 and the second terminal 160 are the same, or the application programs installed on the two terminals are the same type of application programs of different operating system platforms, or the application programs installed on the two terminals are different but support information exchange. The difference operating systems include an Apple operating system, an Android operating system, a Linux operating system, a Windows operating system, and the like.

The first terminal 120 may be generally one of a plurality of terminals, and the second terminal 160 may be generally one of a plurality of terminals. In this embodiment, only the first terminal 120 and the second terminal 160 are used for description. Terminal types of the first terminal 120 and the second terminal 160 are the same or different. The terminal type includes at least one of a smartphone, a game console, a desktop computer, a tablet computer, an eBook reader, an MP3 player, an MP4 player, or a laptop computer. The following embodiments are described by using an example in which at least one of the first terminal 120 or the second terminal 140 is a smartphone and a friend relationship chain exists between the first account and the second account.

A person skilled in the art may learn that there may be more or fewer terminals. For example, there may be only one terminal, or there may be dozens of or hundreds of or more terminals. In this case, the computer system further includes another terminal 180. There is a second account having a friend relationship with a first account being logged in in one or more terminals in another terminal 180. The quantity and the device types of the terminals are not limited in the embodiments of this application.

Figure 2:
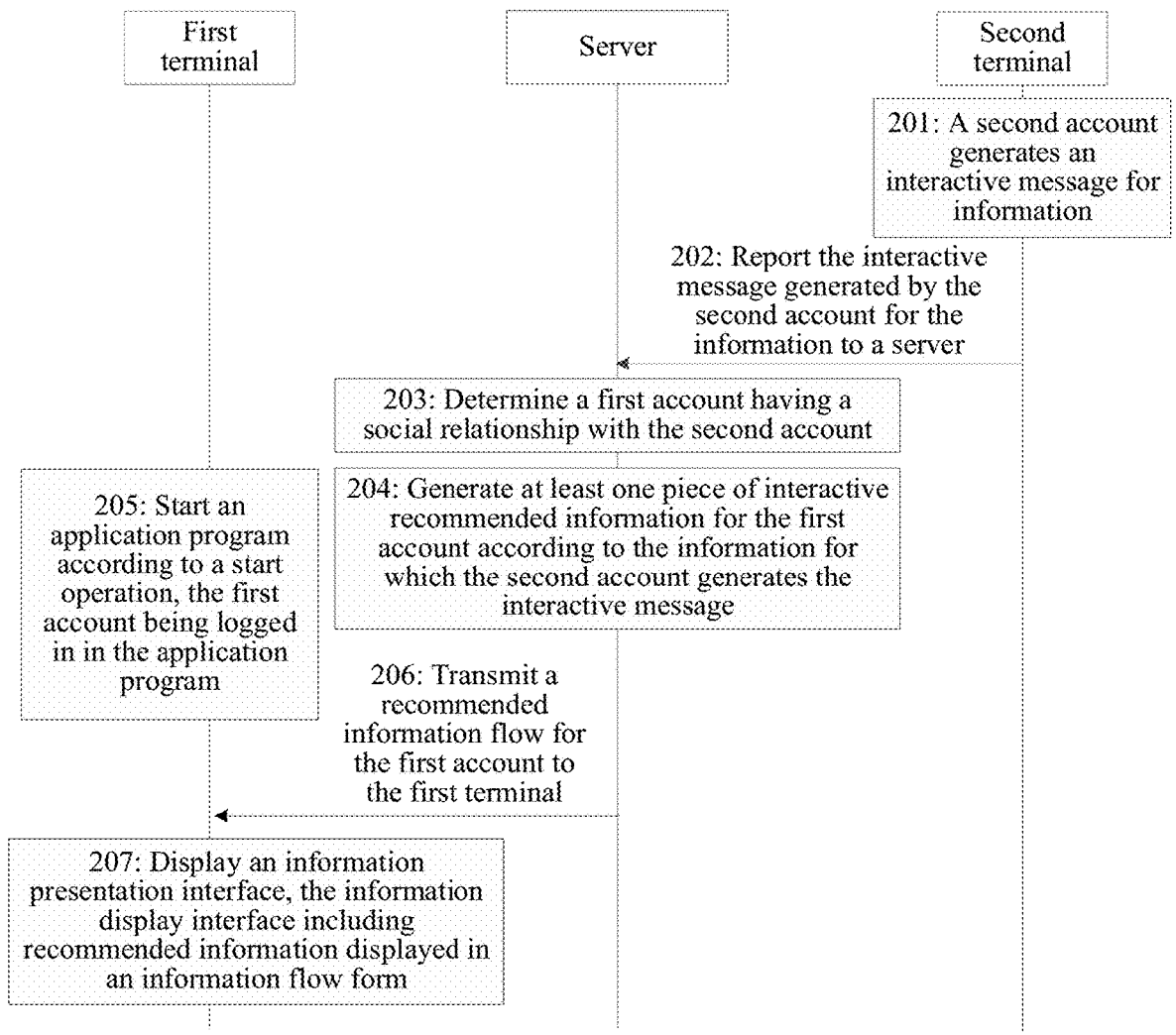
FIG. 2 is a flowchart of an information recommendation method according to an exemplary embodiment of this application.

FIG. 2 is a flowchart of an information recommendation method according to an exemplary embodiment of this application. In this embodiment, description is made by using an example in which the method is applied to the computer system shown in FIG. 1. The method includes the following steps:

Step 201. A second account on a second terminal generates an interactive message corresponding to information.

An application program supporting a social attribute and information recommendation is run on the second terminal, and the second account is logged in in the application program. The second account is an account having a social relationship chain with a first account. This embodiment is described by using an example in which a friend relationship chain exists between the first account and the second account.

The second terminal displays an information presentation interface (or another interface having viewable information), and at least one piece of information for viewing is displayed on the information presentation interface. A user may view the information on the second terminal. The user may generate an interactive message for the information of interest.

The interactive message includes at least one of a like message, a comment message or a comment reply message. That the second account generates the interactive message may be considered as that the second account is interested in information content of the information. In some embodiments, the interactive message may further include a forward message.

In this embodiment, an example in which the interactive message is a like message is used for description. In some embodiments, the like message is generated after the second account presses a like button corresponding to the information.

Step 202. The second terminal reports the interactive message generated by the second account for the information to a server.

For example, the second terminal transmits a like message generated by the second account for the information to the server.

Correspondingly, the server receives and stores interactive messages generated by accounts corresponding to information. The accounts include the first account and the second account.

Step 203. The server determines a first account having a social relationship with the second account.

When needing to perform information recommendation for the first account, the server determines the second account having a social relationship chain with the first account.

Step 204. The server generates at least one piece of interactive recommended information for the first account according to the information for which the second account generates the interactive message.

For the second account having the social relationship chain with the first account, the server determines information for which the second account generates interactive messages as a candidate information set. There may be more than one "second accounts" herein.

As a friend relationship exists between the first account and the second account, it is very likely that the information for which the second account generates the interactive message is information in which the first account is interested.

The server determines (or recalls), according to the social relationship between the first account and the second account, an information set for which a friend account (the second account) of the first account generates interactive messages. Recall may be selecting to-be-recommended candidate information, and all or some of the candidate information may be pushed to a terminal.

The server determines the information set for which the friend account of the first account generates the interactive messages as a candidate set.

In some embodiments, because different second accounts have different social relationship indexes with the first account, the server may generate, according to a social relationship index between the first account and the second account, at least one piece of interactive recommended information in a recommended information flow for the first account from the information set for which the second account generates the interactive messages.

In some embodiments, for each piece of candidate information in the candidate information set, the server calculates a recommendation score of the candidate information according to a social relationship index between the first account and the second account corresponding to the candidate information; and generates candidate information whose recommendation scores rank top n as the interactive recommended information for the first account, the social relationship index being an index used for measuring the social relationship between the first account and the second account. In some embodiments, the social relationship index is obtained through calculation according to at least two social parameters. The social parameters include at least two of interaction frequency, social influence or popularity in a circle.

The interaction frequency is a degree of interaction between different users in a dimension of viewing information, and interaction frequency between two users may be obtained through calculation according to at least one interaction behavior of viewing, liking, commenting, or replying to comment on the same information by the two users. The interaction frequency may also be referred to as interactive influence.

The social influence is the impact of a single user on a friend user in an information propagation dimension. The social influence is also referred to as propagation influence of the second account on the first account.

The popularity in a circle is a degree of attention that a single user draws in the circle of the single user.

In some embodiments, the server further determines a sorting position of the interactive recommended information in the recommended information flow according to the social relationship index between the first account and the second account corresponding to the interactive recommended information, the sorting position of the interactive recommended information being in a positive correlation with the social relationship index.

In some embodiments, the recommended information flow for the first account is generated by the server for the first account, and is considered as an information flow in which a user corresponding to the first account may be interested. In some embodiments, all recommended information in the recommended information flow for the first account is interactive recommended information. In some embodiments, the recommended information in the recommended information flow for the first account includes the interactive recommended information and information for which the first account generates an interactive message. In some embodiments, the recommended information for the first account includes the interactive recommended information and recommended information generated by another recommendation algorithm. A structural form of the recommended information flow is not limited in this embodiment provided that the recommended information flow includes at least one piece of interactive recommended information.

Each piece of interactive recommended information may correspond to one second account or a plurality of independent second accounts.

Step 205. A first terminal starts an application program according to a start operation, the first account being logged in in the application program.

The application program is an application program supporting a social attribute and information recommendation. The first account is logged in in the application program. After being started, the application program notifies the server of a login status of the first account.

Step 206. The server transmits a recommended information flow for the first account to the first terminal.

After generating a recommended information flow for the first account, the server transmits the recommended information flow for the first account to the first terminal periodically or by triggering an event.

For example, the server transmits the recommended information flow for the first account to the first terminal at a preset time every day. In another example, when receiving an information obtaining request of the first account, the server transmits the recommended information flow for the first account to the first terminal. In still another example, when an interaction behavior change of the second account exists in the recommended information flow, the server transmits the recommended information flow of a target signal to the first terminal. A transmission manner of the server is not limited in this embodiment.

The information presentation interface is an interface used for displaying recommended information in an information flow form. The information flow is a display manner of sorting a plurality of pieces of recommended information for display.

In some embodiments, the recommended information flow is a display manner of sorting a plurality of pieces of recommended information in a time order for display. In some embodiments, the recommended information flow is a display manner of performing sorting according to the social relationship index for display. In some embodiments, the recommended information flow is an information flow obtained by performing primary sorting on a plurality of pieces of recommended information in a time order and then performing secondary sorting on recommended information in the same time dimension according to the social relationship index. The sorting may be sorting from top to bottom.

In some embodiments, a sorting position of the interactive recommended information in the recommended information flow is in a positive correlation with the social relationship index, and the social relationship index is an index used for measuring the social relationship between the first account and the second account. In some embodiments, the social relationship index is obtained through calculation according to at least two social parameters. The at least two social parameters include at least two of interaction frequency, propagation influence in a social relationship chain or popularity in a circle.

In some embodiments, the first terminal renders the information presentation interface according to the recommended information flow.

In some embodiments, the interactive recommended information is determined by the server from a plurality of pieces of information for which a plurality of second accounts generate interactive messages. "The information for which the second account generates an interactive message" may be information for which the second account generates an interactive message in another interface, and another interface is a user interface other than the information presentation interface in the current application program, or a user interface in another application program having information exchange with the current application program. In some embodiments, the interactive recommended information is determined by the server in descending order of social relationship index between the first account and the second account corresponding to each piece of information from a plurality of pieces of information for which the second account generates interactive messages.

Step 207. The first terminal displays an information presentation interface, the information presentation interface including the recommended information displayed in an information flow form.

In some embodiments, the information presentation interface includes a plurality of list controls arranged from top to bottom, and each list control is configured to display one piece of recommended information.

In some embodiments, when the recommended information includes interactive recommended information, account information of the second account is displayed at a recommendation source location in a list control corresponding to at least one piece of interactive recommended information, and the account information includes at least one of an account, a nickname or a profile picture.

Figure 3:
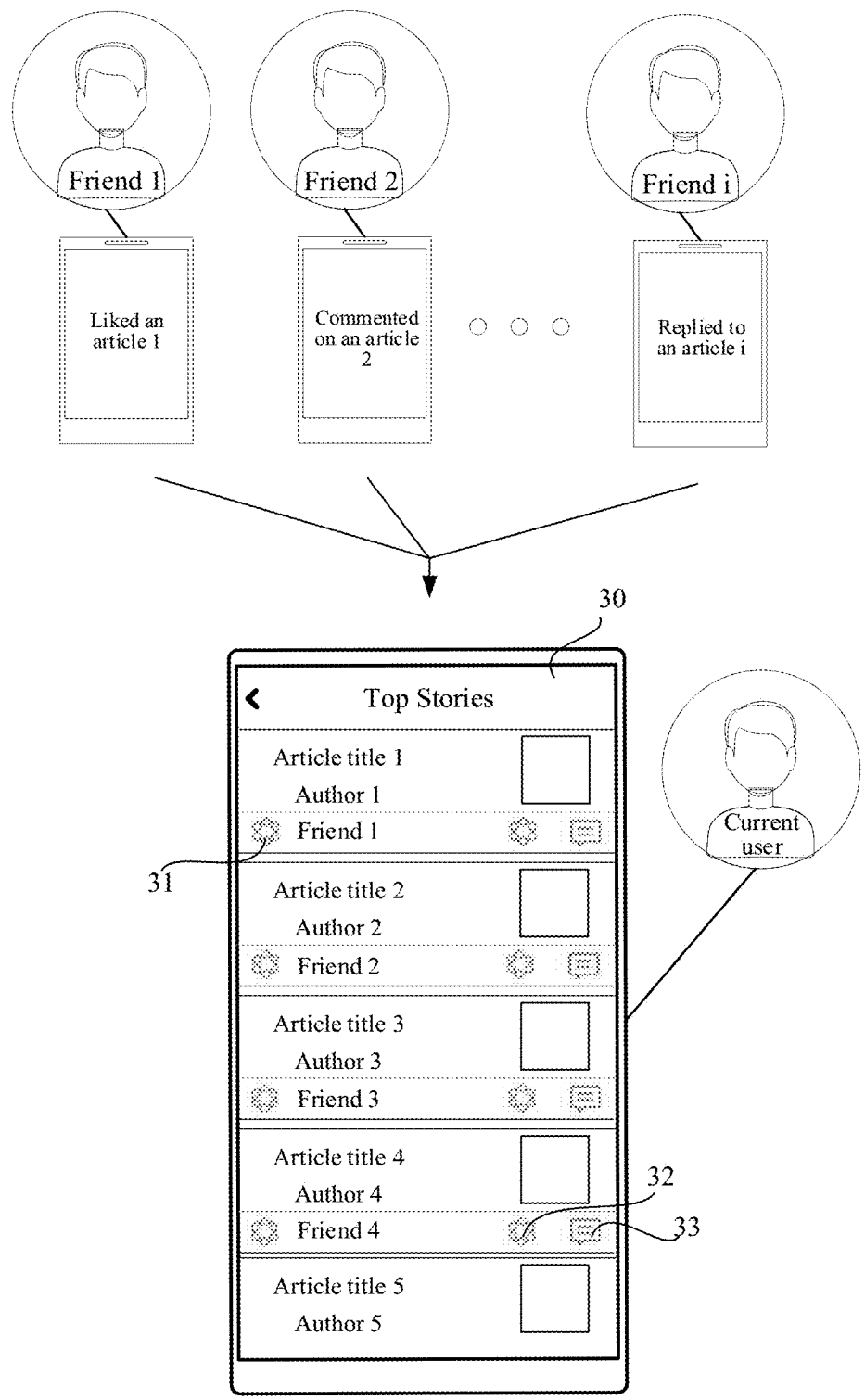
FIG. 3 is a schematic diagram of an interface of an information recommendation method according to an exemplary embodiment of this application.

For example, as shown in FIG. 3, for a current user, after interactive messages, for example, "a friend 1 liked an article 1", "a friend 2 commented on an article 2", . . . , and "a friend i replied to an article i", are generated, the server generates a recommended article flow for the current user based on the articles for which the friends generate the interactive messages. A terminal of the current user displays an information presentation interface "Top Stories" 30, a plurality of pieces of recommended information arranged from top to bottom are displayed on the information presentation interface "Top Stories" 30, each piece of recommended information occupies one list control, and an article title and an author of a recommended article are displayed in the list control. In some embodiments, at least one of a recommendation source 31, a like button 32 or a comment button 33 is further displayed in the list control.

In some embodiments, a corresponding interactive message display area is further displayed in the information presentation interface for all or some of the recommended information, and the interactive message display area of each piece of recommended information may be displayed below the recommended information. The interactive message display area is used for displaying at least one of a like message, a comment message or a comment reply message for current recommended information by at least one of the first account or the second account. A user may interact with the second account in the information presentation interface based on the recommended information, and an interaction manner may be at least one of liking the recommended information in the information presentation interface, commenting on the recommended information in the information presentation interface, or replying to comment information of the second account in the information presentation interface.

In summary, according to the information recommendation method provided in this embodiment, an information set for which a second account (a second account of a first account) generates interactive messages is used as a candidate information set, to generate a recommended information flow including interactive recommended information for the first account, so that information recommendation can be performed without depending on a tag in which the first account is interested. When the second account generates an interactive message corresponding to information, it indicates that the second account is interested in the information, and a social relationship chain exists between the first account and the second account (for example, the two accounts are in a friend relationship). Therefore, it is very likely that the first account is also interested in the information, thereby improving information quality and recommendation efficiency of the recommended information flow.

Compared with using an information set that the second account has viewed as a candidate information set, an information set for which the second account generates interactive messages is used as a candidate information set, so that information in which the second account is really interested can be selected, thereby reducing a computation amount of the server. Cases in which the server needs to perform repeated pushing due to inaccurate pushing are reduced, information pushing resources are saved, and load of the server is reduced.

For one piece of recommended information, in this embodiment of this application, recommendation may be performed for the first account based on the interest of a single second account, and the interest of the current account does not need to be analyzed by comprehensively considering the interest of a plurality of second accounts, to reduce a computation amount of the server to some extent.

In addition, because the account information of the second account may be externally displayed at the recommendation source location of the recommended information, for the first account, credibility and social interaction of the interactive recommended information can be enhanced.

Figure 4:
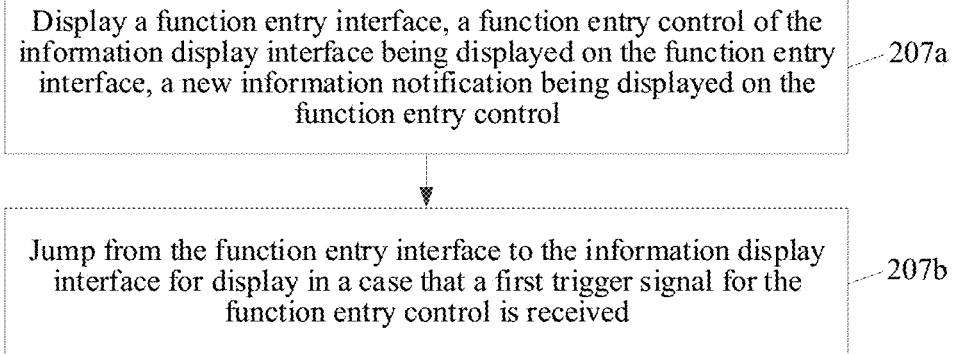
FIG. 4 is a flowchart of an information recommendation method according to an exemplary embodiment of this application.

In one embodiment, step 207 may be implemented as step 207a and step 207b, as shown in FIG. 4.

Step 207a. The first terminal displays a function entry interface, a function entry control of the information presentation interface being displayed on the function entry interface, a new information notification being displayed on the function entry control.

Because an application program may have a plurality of application functions, the first terminal may first display a function entry interface of the application program in an initial state, and the function entry control of the information presentation interface is displayed on the function entry interface. In some embodiments, a function entry control of another function interface is further displayed on the function entry interface.

Figure 5:
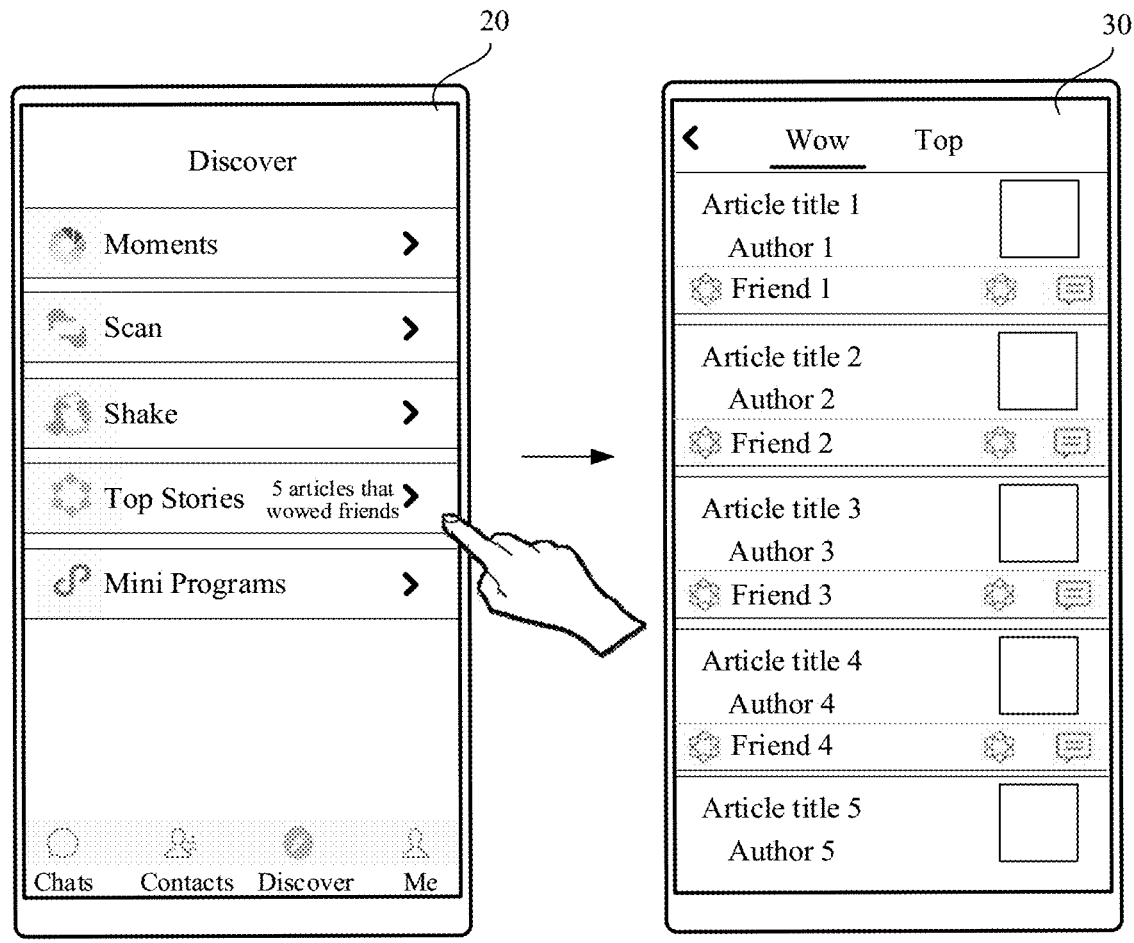
FIG. 5 is a schematic diagram of an interface of an information recommendation method according to an exemplary embodiment of this application.

For example, as shown in FIG. 5, the application program is an instant messaging program, and a function entry "Moments", a function entry "Scan", a function entry "Shake", a function entry "Top Stories", and a function entry "Mini Programs" are displayed on a function entry interface 20 of the instant messaging program. The function entry "Top Stories" is a function entry control of an information presentation interface.

Step 207b. The first terminal jumps from the function entry interface to the information presentation interface for display in a case that a first trigger signal for the function entry control is received.

After the function entry of the information presentation interface "Top Stories" is tapped/clicked, a jump is made from the function entry interface 20 to an information presentation interface 30 for display.

In some embodiments, the server not only adds the interactive recommended information to the recommended information flow for the first account, but also adds recommended information obtained by performing information recommendation by using another recommendation algorithm to the recommended information flow for the first account. Another recommendation algorithm includes, but is not limited to, using an original article of a target account followed by the first account as other recommended information. The target account is an account determined according to a follow relationship chain of the first account.

For example, as shown in FIG. 5, the information presentation interface 30 includes a tab "Wow" and a tab "Top". The tab "Wow" is used for displaying interactive recommended information, and the tab "Top" is used for displaying recommended information obtained by performing the information recommendation based on another recommendation algorithm. When the information presentation interface 30 is just opened, the interactive recommended information in the tab "Wow" may be provided by default.

In another exemplary example, the information presentation interface includes a first tab and a second tab. Either of the first tab and the second tab is used for displaying the interactive recommended information. For example, the second tab is used for displaying the interactive recommended information, and the first tab is used for displaying other recommended information other than the interactive recommended information in the recommended information. In some embodiments, the first terminal first jumps from the function entry interface to the first tab of the information presentation interface for display, a label of the second tab being further displayed on the first tab. The first terminal switches from the first tab to the second tab in the information presentation interface for display in a case that a trigger signal corresponding to the label of the second tab is received.

Figure 6:
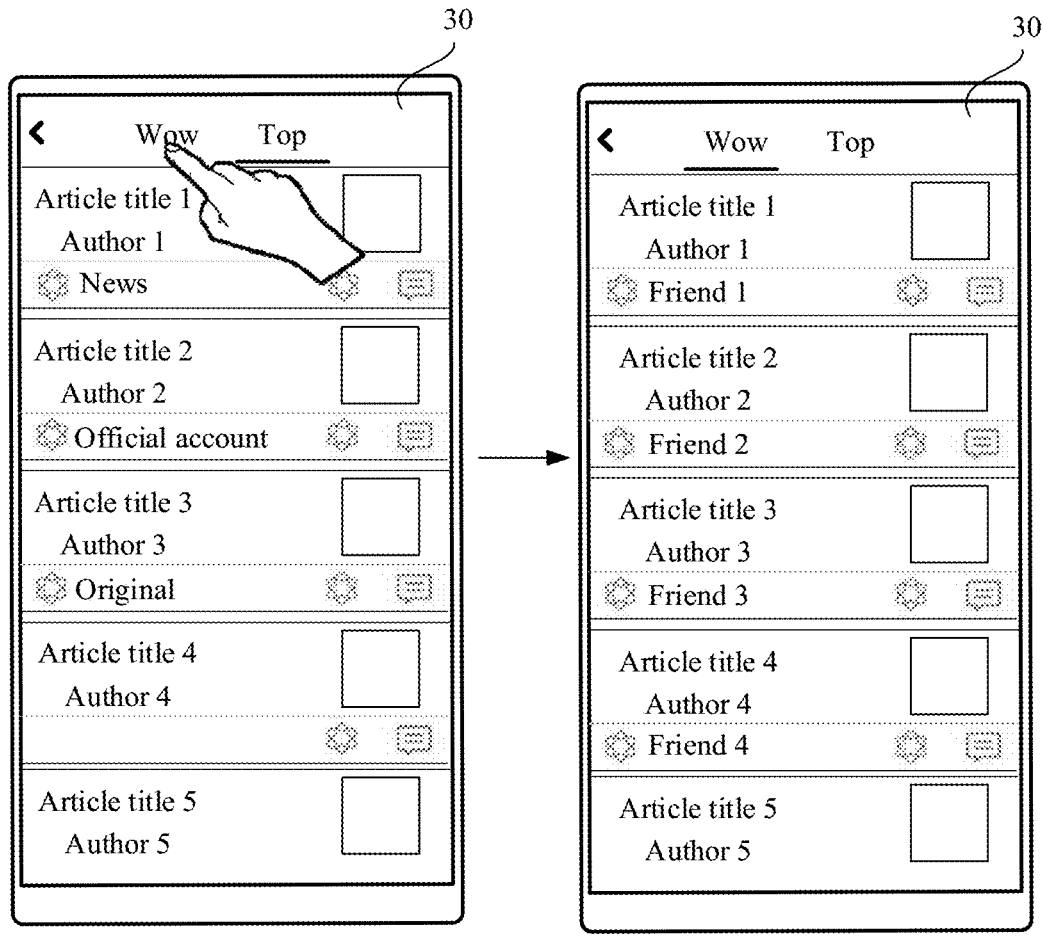
FIG. 6 is a schematic diagram of an interface of an information recommendation method according to an exemplary embodiment of this application.

For example, as shown in FIG. 6, the first tab is the tab "Top", the second tab is the tab "Wow", and the information presentation interface 30 includes the tab "Wow" and the tab "Top". The tab "Wow" is used for displaying interactive recommended information, and the tab "Top" is used for displaying recommended information obtained by performing the information recommendation based on another recommendation algorithm. When the information presentation interface 30 is just opened, information in the tab "Top" may be displayed by default. Next, when the tab "Wow" is tapped/clicked, the tab "Top" is switched to the tab "Wow" for display.

In summary, according to the method provided in this embodiment, when a recommended information flow for a first account includes both interactive recommended information and other recommended information, the interactive recommended information is displayed in one tab in an information presentation interface, and the other recommended information is displayed in another tab in the information presentation interface, making it convenient for a user to view the interactive recommended information and the other recommended information according to two different recommended information flows, thereby improving viewing efficiency of the interactive recommended information.

Certainly, the interactive recommended information and the other recommended information may also be mixed in the same recommended information flow, and the interactive recommended information and the other recommended information are sorted in descending order of comprehensive score of recommended information. The comprehensive score of each piece of recommended information is obtained through calculation according to a plurality of factors such as content quality, influence of a recommendation source on the first account or influence of a recommendation source, and "a plurality of" may be at least two.

Figure 7:
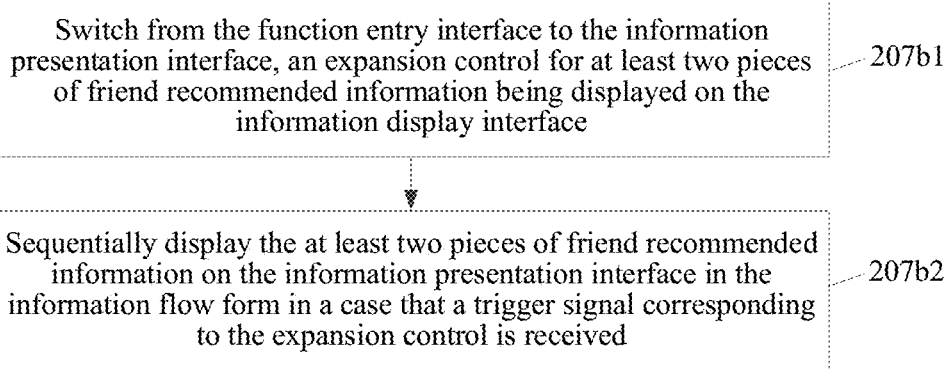
FIG. 7 is a flowchart of an information recommendation method according to an exemplary embodiment of this application.

In another optional example, at least two pieces of interactive recommended information in a collapsed display state are displayed in the information presentation interface. For example, the recommended information flow includes interactive recommended information and also includes other recommended information generated by another recommendation algorithm. Some of the interactive recommended information is displayed in the information presentation interface by default, and the remaining interactive recommended information is displayed in a collapsed manner. In this case, step 207b further includes step 207b1 and step 207b2, as shown in FIG. 7.

Step 207b1. Switch from the function entry interface to the information presentation interface, an expansion control for the at least two pieces of interactive recommended information being displayed on the information presentation interface.

In some embodiments, the expansion control is a control used for expanding at least two pieces of interactive recommended information. The expansion control may be at least one of a button control "Friends are viewing", a button control "Buddies are viewing" or a list control "Articles that wowed friends".

Figure 8:
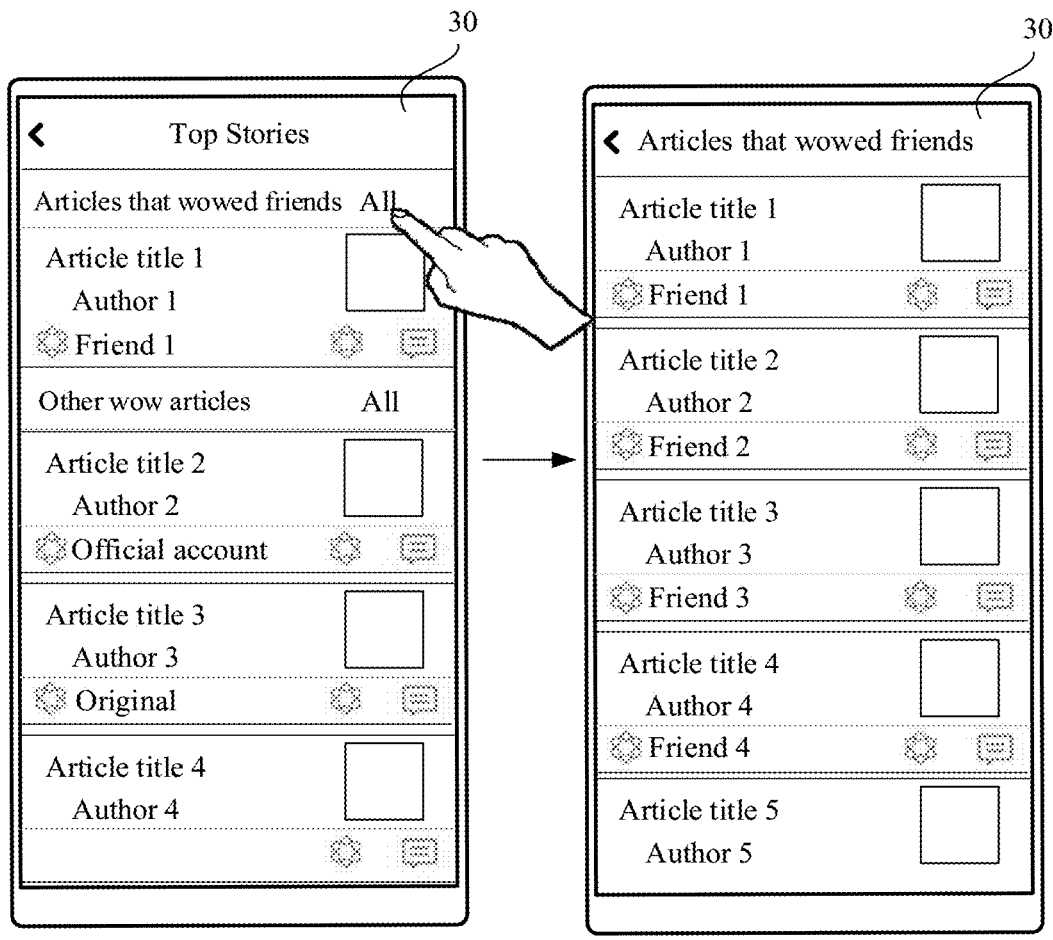
FIG. 8 is a schematic diagram of an interface of an information recommendation method according to an exemplary embodiment of this application.

As shown in FIG. 8, a plurality of "Articles that wowed friends" displayed in a collapsed manner, a plurality of "Other wow articles" displayed in a collapsed manner, and an expansion control "All" button are displayed in the information presentation interface 30. The expansion control "All" button is configured to expand at least two pieces of interactive recommended information in a collapsed display state.

Step 207b2. Display the at least two pieces of interactive recommended information on the information presentation interface in the information flow form in a case that a trigger signal corresponding to the expansion control is received.

After a user taps/clicks the expansion control "All" button, a plurality of pieces of interactive recommended information in the "Articles that wowed friends" may be expanded and displayed in the information presentation interface.

In summary, according to the method provided in this embodiment, when a recommended information flow for a first account includes both interactive recommended information and non-interactive recommended information, a plurality of pieces of interactive recommended information are displayed in one area in an information presentation interface in a collapsed manner. It is convenient for a user to view the interactive recommended information without occupying an excessive display area of the information presentation interface, thereby improving viewing efficiency of the interactive recommended information.

In one embodiment, for at least one piece of interactive recommended information, an interactive message display area of the interactive recommended information is further displayed in the information presentation interface. The interactive message display area is a partial area used for displaying an interactive message for the interactive recommended information in the information presentation interface, or may be referred to as a like area or a comment area. In some embodiments, the interactive message display area may be an area used for displaying a comment message and a comment reply message.

Figure 9:
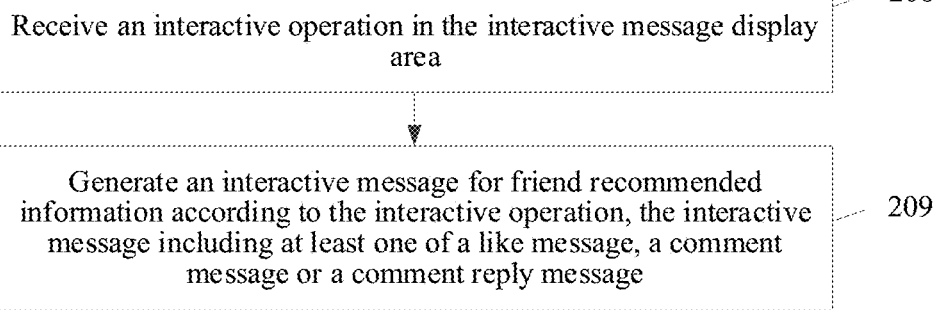
FIG. 9 is a flowchart of an information recommendation method according to an exemplary embodiment of this application.

After step 207, step 208 and step 209 are further included, as shown in FIG. 9.

Step 208. The first terminal receives an interactive operation in the interactive message display area.

The first terminal receives an interactive operation of a user in the interactive message display area. The interactive operation includes, but is not limited to at least one of the following operations: an operation of liking recommended information, an operation of commenting on recommended information, and an operation of replying to a comment message of the second account in recommended information.

Step 209. The first terminal generates the interactive message for the interactive recommended information according to the interactive operation, the interactive message including at least one of a like message, a comment message or a comment reply message.

Figure 10:
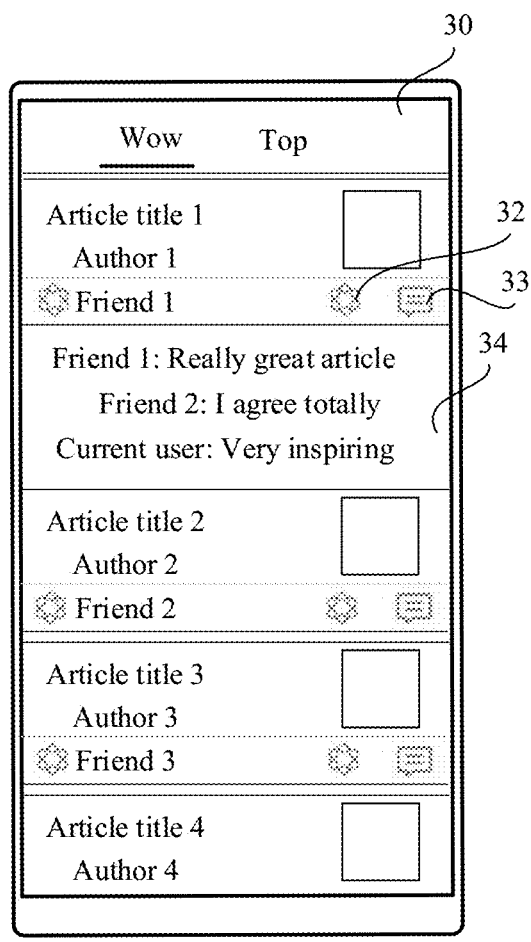
FIG. 10 is a schematic diagram of an interface of an information recommendation method according to an exemplary embodiment of this application.

As shown in FIG. 10, when a user taps/clicks the like button 32 in an interactive message display area 34, a like message may be generated. When the user taps/clicks the comment button 33 in the interactive message display area 34 and then enters a text, a comment message may be generated. When the user taps/clicks a comment message of a friend in the interactive message display area 34 and then enters a text, a comment reply message may be generated.

In some embodiments, after generating the interactive message for the interactive recommended information according to the interactive operation, the first terminal transmits the interactive message to the server, and the server receives and stores the interactive message for the interactive recommended information by the first account.

In summary, according to the method provided in this embodiment, an interactive message display area is displayed in an information presentation interface, and an account can like, comment on or reply to a comment on recommended information in the interactive message display area, so that the information presentation interface can provide an interaction channel between a first account and a second account, and the first account can quickly interact with the second account when browsing information. More interaction forms between the first account and the second account are provided, so that two users at different time and space share the same feelings and emotions based on the same recommended information.

Figure 11:
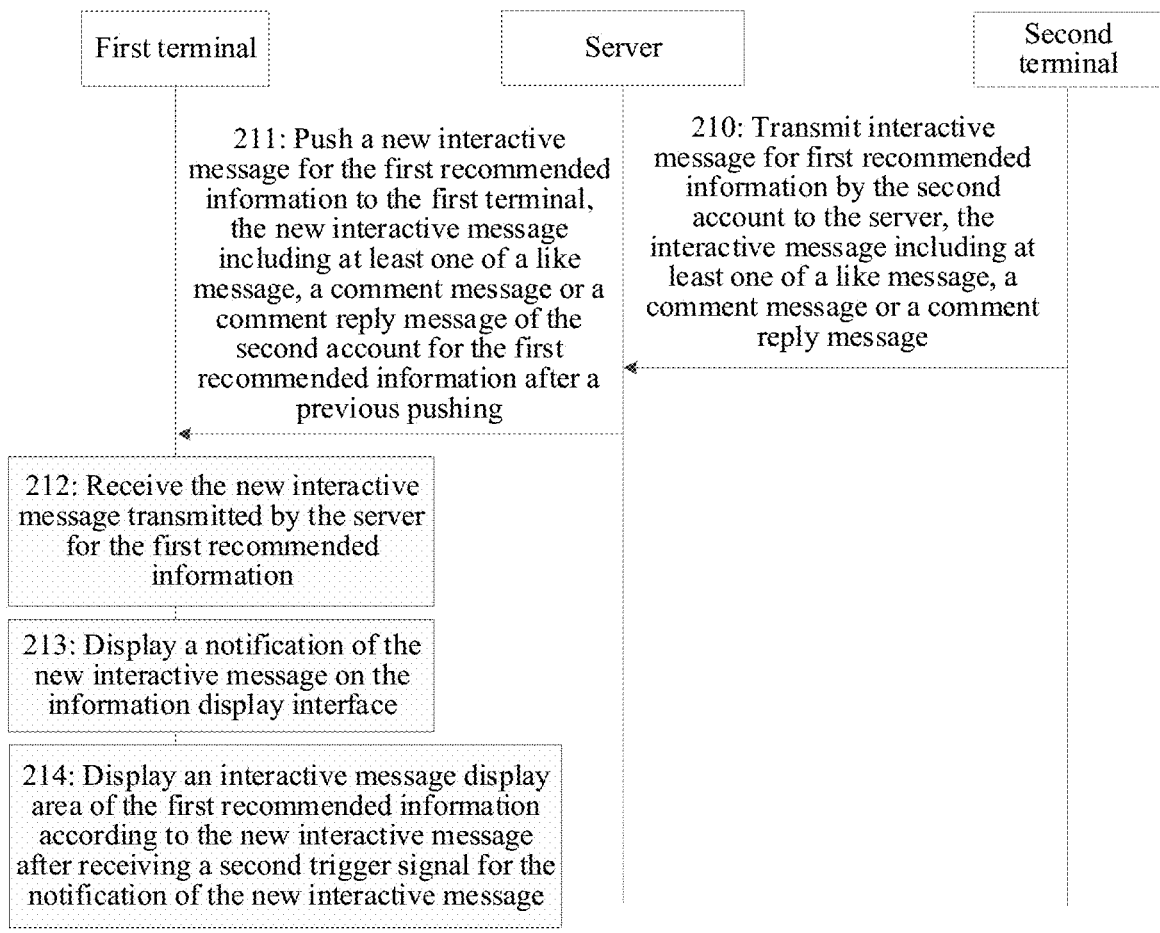
FIG. 11 is a flowchart of an information recommendation method according to an exemplary embodiment of this application.

In one embodiment, after step 207, step 210, and step 211 are further included, as shown in FIG. 11.

Step 210. The second terminal transmits an interactive message for first recommended information by the second account to the server, the interactive message including at least one of a like message, a comment message or a comment reply message.

The recommended information flow pushed by the server to the first terminal includes the first recommended information, and the first recommended information is any one piece of recommended information that is recommended based on the social relationship chain. When one or more second accounts generate new interactive messages for the first recommended information, a second terminal used by a friend account transmits the interactive message to the server, and the interactive message includes at least one of a like message, a comment message or a comment reply message of the second account for the first recommended information.

Correspondingly, the server receives and temporarily stores the interactive message transmitted by the second terminal.

Step 211. The server pushes a new interactive message for the first recommended information to the first terminal, the new interactive message including at least one of a like message, a comment message or a comment reply message of the second account for the first recommended information after a previous pushing.

In some embodiments, compared with a previous push moment of the recommended information flow, when there is a new interactive message, the server may transmit the new interactive message for the first recommended information (one or more pieces) to the first terminal immediately.

In some embodiments, the server transmits the new interactive message for the first recommended information (one or more pieces) in the recommended information flow to the first terminal at a predetermined time interval.

In some embodiments, when a quantity of new interactive messages reaches a preset quantity, the server transmits the new interactive message for the first recommended information (one or more) in the recommended information flow to the first terminal.

Step 212. The first terminal receives the new interactive message transmitted by the server for the first recommended information.

Step 213. The first terminal displays a notification of the new interactive message on the information presentation interface.

In some embodiments, the first terminal displays the new interactive message in a preset area of the information presentation interface. At least one of a notification red dot indicating that a new interactive message is generated, account information of the second account of the new interactive message, a quantity of new interactive messages, a preview of the new interactive message is displayed on the new interactive message.

Figure 12:
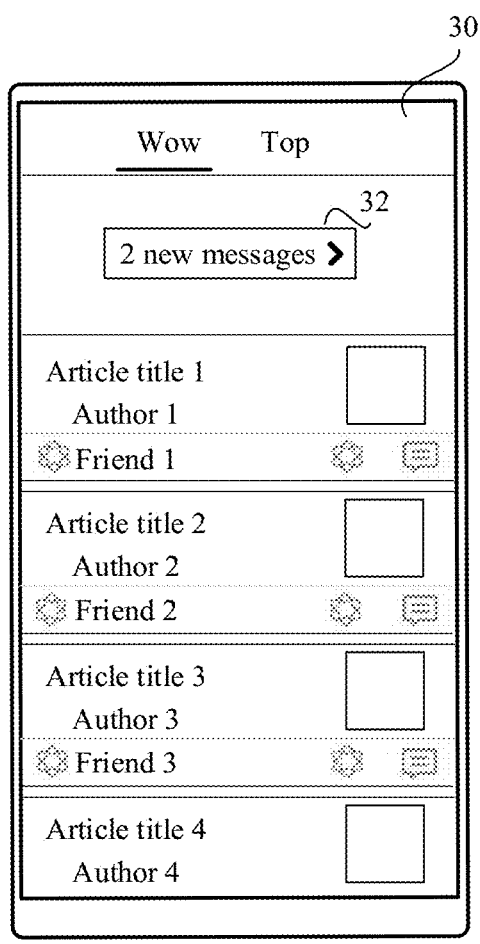
FIG. 12 is a schematic diagram of an interface of an information recommendation method according to an exemplary embodiment of this application.

Referring to FIG. 12, the first terminal displays a quantity of new interactive messages in a top area 32 of the information presentation interface 30.

Step 214. The first terminal displays an interactive message display area of the first recommended information according to the new interactive message after receiving a second trigger signal for the notification of the new interactive message.

In an optional implementation, when receiving the second trigger signal for the notification of the new interactive message, the first terminal displays the interactive message display area of the first recommended information on the information presentation interface. The interactive message display area includes at least one of a like message, a comment message or a comment reply message for the first recommended information.

Figure 13:
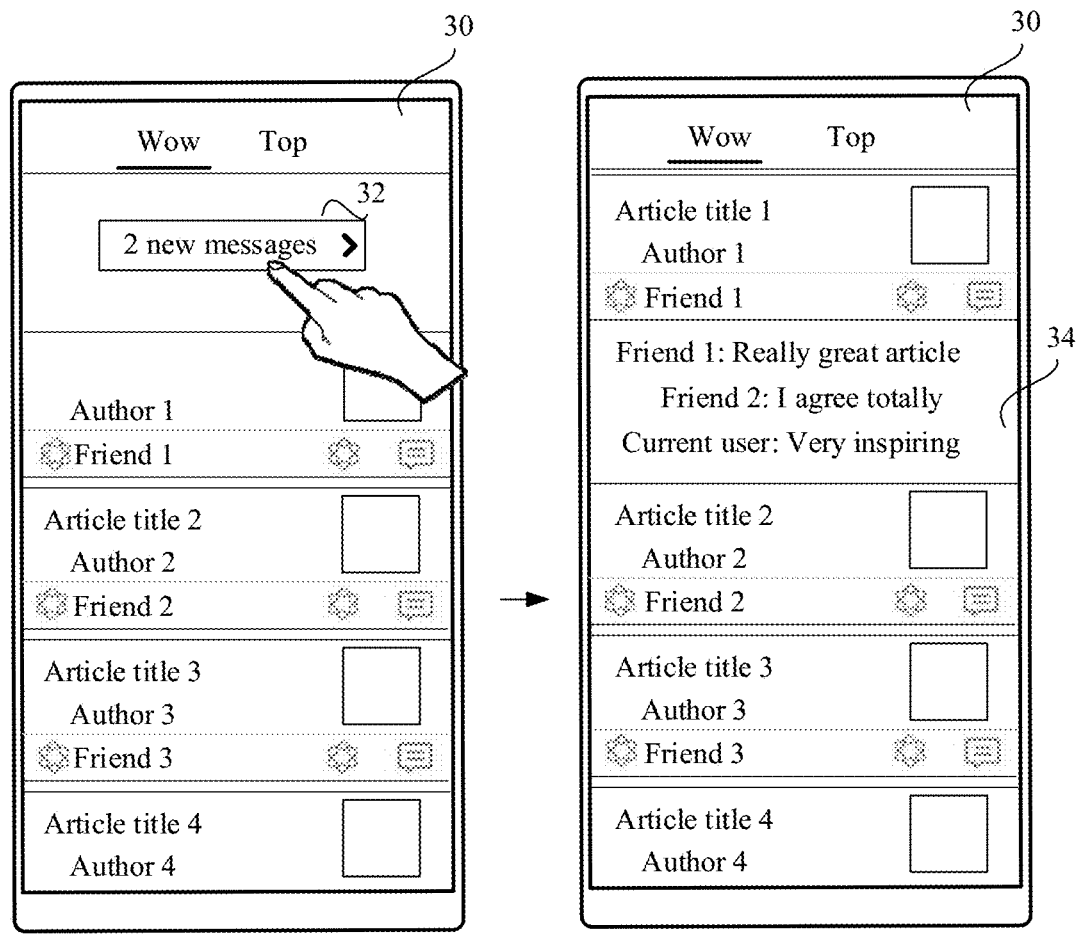
FIG. 13 is a schematic diagram of an interface of an information recommendation method according to an exemplary embodiment of this application.

Referring to FIG. 13, after a user receives the second trigger signal in the top area 32 on the information presentation interface 30, the interface remains unchanged, and an interactive message display area 34 of the first recommended information is displayed on the information presentation interface 30.

In another optional implementation, when receiving the second trigger signal for the notification of the new interactive message, the first terminal jumps from the information presentation interface to an interactive display interface. The interactive message display area of the first recommended information is displayed in the interactive display interface, and the interactive message display area includes at least one of a like message, a comment message or a comment reply message for the first recommended information.

Figure 14:
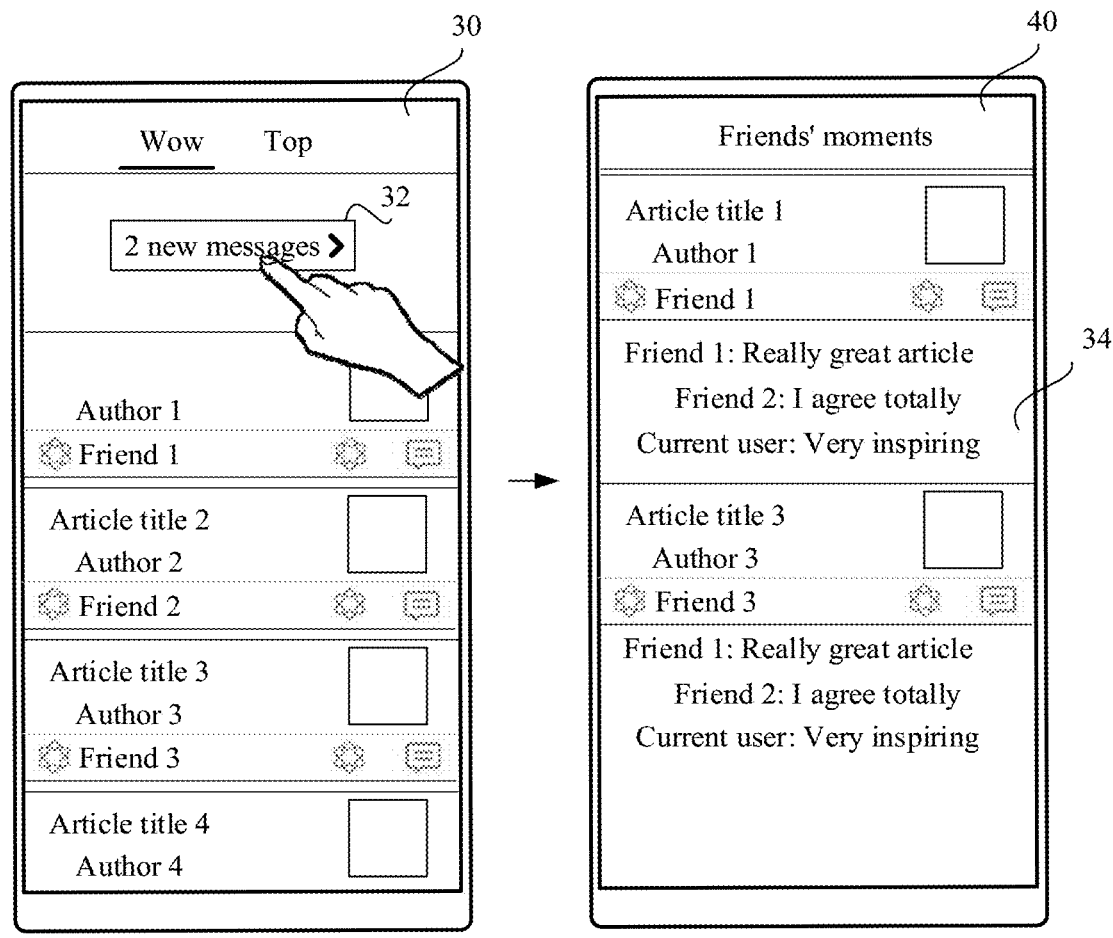
FIG. 14 is a schematic diagram of an interface of an information recommendation method according to an exemplary embodiment of this application.

Referring to FIG. 14, after a user receives the second trigger signal in the top area 32 on the information presentation interface 30, the first terminal switches from the information presentation interface 30 to an interactive display interface 40, and an interactive message display area 34 of the first recommended information is displayed on the interactive display interface 40.

In some embodiments, the interactive messages are arranged in reverse order of interaction time for display on the interactive message display area.

In some embodiments, only a new interactive message is displayed in the interactive message display area of the first recommended information, and a historical interactive message is displayed in a collapsed display state.

In some embodiments, in a case that a quantity of the historical interactive messages and new interactive messages for the first recommended information is greater than a preset quantity, target interactive messages whose quantity exceeds the preset quantity in the historical interactive messages and the new interactive messages are determined, and the target interactive messages are displayed in the collapsed display state in the interactive message display area. The target interactive message is switched from the collapsed display state to an expanded display state in the interactive message display area in a case that an expansion signal for the target interactive message is received.

As shown in FIG. 15, after receiving new interactive messages, the first terminal displays a notification "5 new messages" for the new interactive messages in a top area of an information presentation interface "Top Stories". When the notification "5 new messages" is tapped/clicked, the first terminal switches from the information presentation interface "Top Stories" to an interactive display interface "Friends' moments", and three new comment messages for recommended information "Dear Capital, Stop Toying with User Privacy. Respect It" and a "More" button are displayed on the "Friends' moments" in the interactive display interface. When the "More" button is tapped/clicked, collapsed historical comment messages are displayed.

In summary, according to the method provided in this embodiment, after the second terminal generates a new interactive message, the server transmits the new interactive message to the first terminal in time, and the latest interactive message is displayed in an interactive message display area of the first terminal, so that the first account and the second account can interact socially based on interactive recommended information. More interaction forms between the first account and the second account are provided, so that two users at different time and space share the same feelings and emotions based on the same recommended information.

In one embodiment, the server further adds second recommended information to the recommended information flow for the first account, the second recommended information being information for which the first account generates an interactive message in another interface. In this case, the second recommended information is further displayed in the information presentation interface. Another interface is an interface different from the information presentation interface, for example, an interface in which a friend shares information, an interface of subscription information, or a user interface of another application program that exchanges information with the application program.

There may be one or more pieces of second recommended information. Therefore, the method further includes step 215 and step 216, as shown in FIG. 16.

Step 215. Display, in a case that a quantity of pieces of second recommended information exceeds a preset quantity, target second recommended information whose quantity of pieces exceeds the preset quantity in the collapsed display state in the information presentation interface.

In a case that the quantity of pieces of second recommended information exceeds the preset quantity, the target second recommended information whose quantity of pieces exceeds the preset quantity is displayed in the collapsed display state. In some embodiments, when a plurality of pieces of second recommended information are sorted in reverse order of time, target second recommended information may be a plurality of pieces of second recommended information with higher sorting positions.

For example, the preset quantity is 1. When a quantity of pieces of second recommended information exceeds 1, the latest second recommended information is displayed in a normal display state, and earlier second recommended information of the latest second recommended information is displayed in the collapsed display state.

Figure 17:
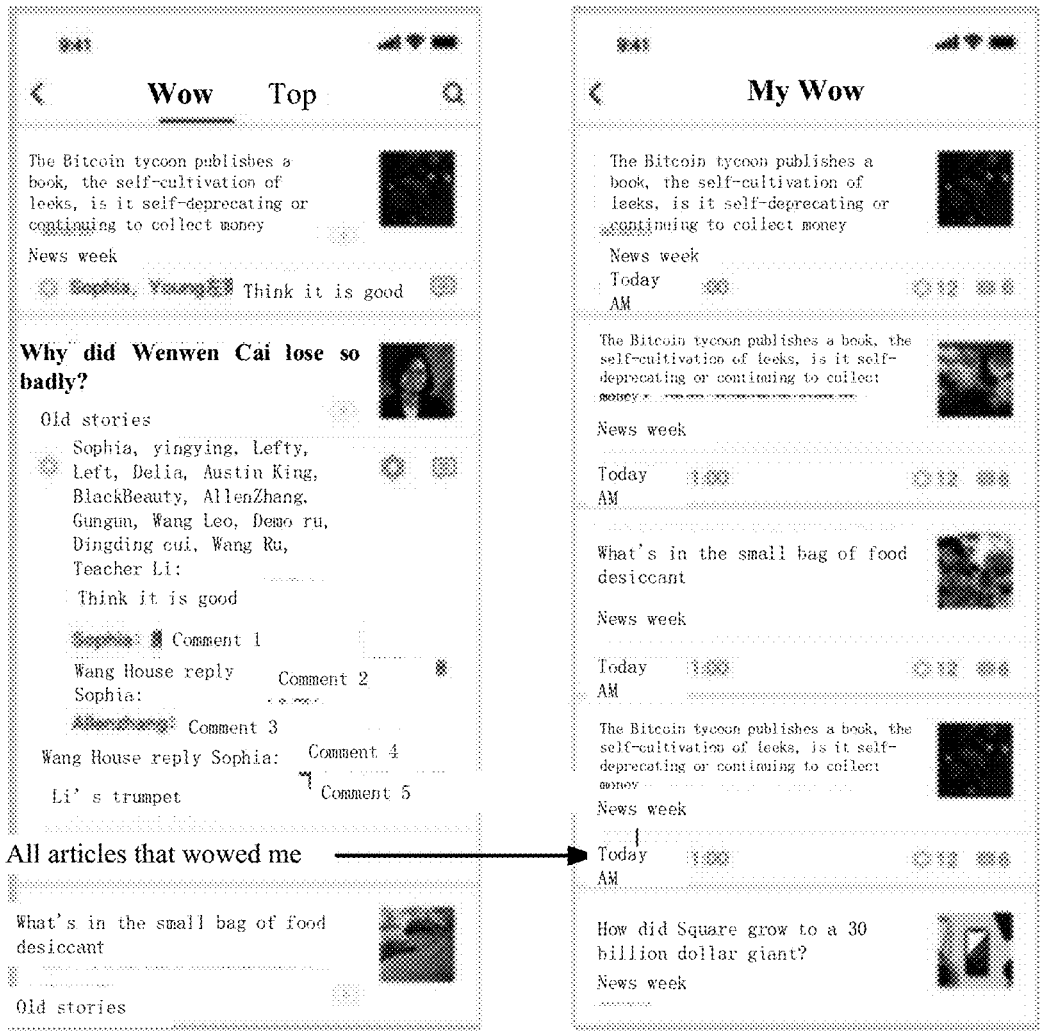
FIG. 17 is a schematic diagram of an interface of an information recommendation method according to an exemplary embodiment of this application.

Referring to FIG. 17, the latest article "Why did Wenwen Cai lose so badly" liked by a current user is displayed in the information presentation interface 30, and other articles liked by the current user are displayed in the collapsed display state. An expansion control "All articles that wowed me" is further displayed below the "Why did Wenwen Cai lose so badly".

Step 216. Switch the target second recommended information from the collapsed display state to an expanded display state in the information presentation interface in a case that an expansion signal for the target second recommended information is received.

Referring to FIG. 17, when a user taps/clicks the expansion control "All articles that wowed me", the other articles that are collapsed are switched from the collapsed display state to an expanded display state.

In some embodiments, an interactive message display area of the second recommended information is further displayed in the information presentation interface, and the interactive message display area includes interactive messages for the second recommended information by the first account and/or the second account.

In some embodiments, when a quantity of interactive messages for the second recommended information is greater than a preset quantity, target interactive messages whose quantity exceeds the preset quantity are displayed in the collapsed display state in the interactive message display area. When an expansion signal for an earlier interactive message is received, the target interactive messages are switched from the collapsed display state to the expanded display state in the interactive message display area.

In summary, according to the method provided in this embodiment, information that has been viewed by the first account is displayed in a collapsed manner, so that a user still can view articles the user is interested in without occupying an excessive display area on an information presentation interface, thereby achieving an effect of aggregating and collecting articles in which the user is interested.

In one embodiment, the server further adds third recommended information to the recommended information flow for the first account, the third recommended information being information that is set to be read later in another interface by the first account. In this case, the third recommended information is further displayed in the information presentation interface. Another interface is an interface different from the information presentation interface, for example, an interface in which a friend shares information, an interface of subscription information, and a user interface of another application program that exchanges information with the application program.

In some embodiments, in a case that a quantity of pieces of second recommended information exceeds a preset quantity, target second recommended information whose quantity of pieces exceeds the preset quantity is displayed in the collapsed display state in the information presentation interface. The target second recommended information is switched from the collapsed display state to an expanded display state in the information presentation interface in a case that an expansion signal for the target second recommended information is received.

In one embodiment, sorting priorities of various types of recommended information in the recommended information flow (all information flows or some information flows within the same recommendation interval) includes that:

interactive recommended information for which the first account and the second account simultaneously generate interactive messages has a first priority;

recommended information for which the first account generates an interactive message and/or that is set to be read later has a second priority; and interactive recommended information for which the second account generates an interactive message has a third priority, the first priority being greater than the second priority, the second priority being greater than the third priority.

In one embodiment, the first terminal collapses interactive recommended information from the same second account for display in the information presentation interface. For example, this embodiment includes, but is not limited to, the following two cases:

First, a plurality of pieces of recommended information on which the same second account performs interaction within a short time are collapsed for display, because a plurality of interactions within a short time may be malicious behaviors.

Second, a plurality of pieces of low-quality interactive recommended information for which the same second account generates interactive messages are collapsed for display, because a degree of interest of the first account in low-quality recommended information may be relatively low.

Figure 18:
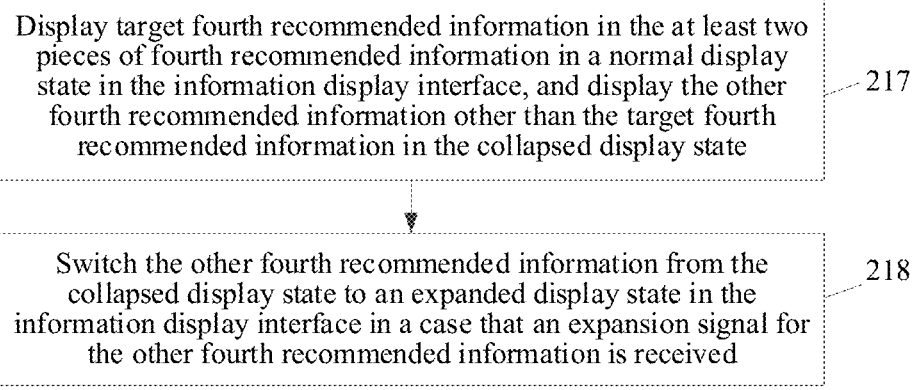
FIG. 18 is a flowchart of an information recommendation method according to an exemplary embodiment of this application.
Figure 20:
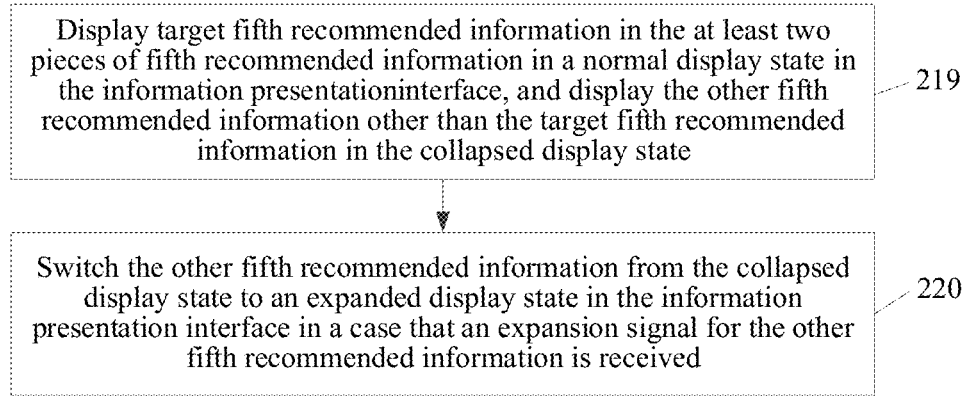
FIG. 20 is a flowchart of an information recommendation method according to an exemplary embodiment of this application.

For the first manner, reference is made to an embodiment shown in FIG. 18, and for the second manner, reference is made to an embodiment shown in FIG. 20.

The recommended information flow further includes at least two pieces of fourth recommended information on which the same second account performs effective viewing within preset duration. The preset duration is relatively short duration set according to an empirical value. When the same second account performs effective viewing (for example, liking) on a plurality of pieces of information within relatively short duration, frequent liking is determined. If an interest similarity between the second account and the first account is quite different, a degree of interest of the first account in the fourth recommended information is also correspondingly poor. The method further includes step 217 and step 218, as shown in FIG. 18.

Step 217. Display target fourth recommended information in the at least two pieces of fourth recommended information in a normal display state in the information presentation interface, and display the other fourth recommended information other than the target fourth recommended information in the collapsed display state.

The target fourth recommended information is one or more pieces of information selected from all the fourth recommended information, and a selection condition of the target fourth recommended information may be at least one of the following: an interaction time is the latest, information quality is the highest, and a quantity of interactive messages for the second account is the largest.

In some embodiments, the server selects target fourth recommended information from at least two pieces of fourth recommended information, and adds a first mark of the target fourth recommended information to the recommended information flow, so that the first terminal determines the target fourth recommended information from the at least two pieces of fourth recommended information according to the first mark.

Step 218. Switch the other fourth recommended information from the collapsed display state to an expanded display state in the information presentation interface in a case that an expansion signal for the other fourth recommended information is received.

Figure 19:
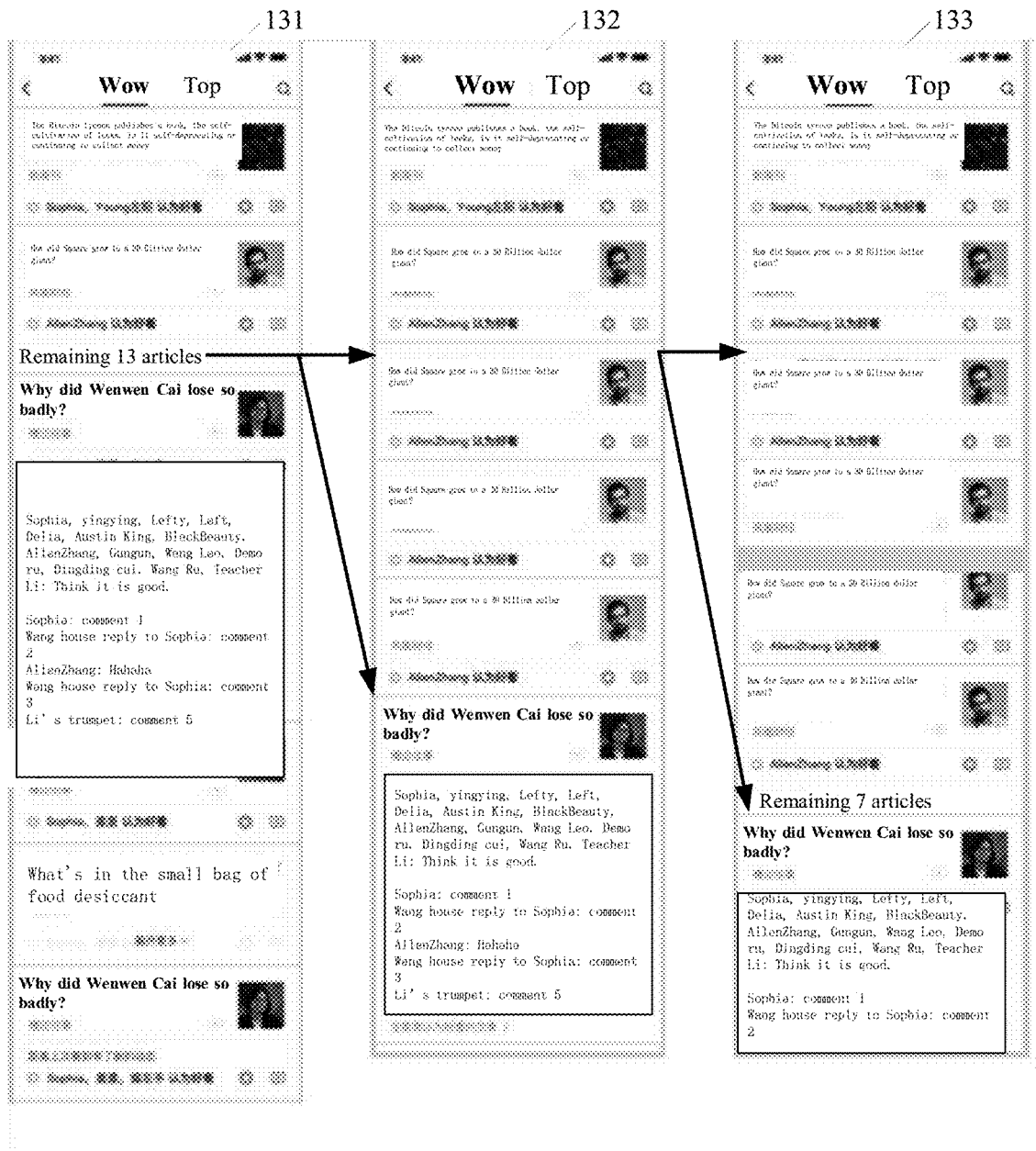
FIG. 19 is a schematic diagram of an interface of an information recommendation method according to an exemplary embodiment of this application.

Referring to FIG. 19, when the same friend user likes a plurality of articles within a short time, in an initial state 131 of the information presentation interface, a target article in the plurality of articles liked by the same friend user "Allenzhang" is displayed normally in a recommended information flow. Other articles liked by the friend user are displayed in a collapsed manner in the recommended information flow, and an expansion control "Remaining 13 articles" is displayed. When the user taps/clicks the expansion control "Remaining 13 articles", the articles are switched from the collapsed display state to an expanded display state 132 in the information presentation interface.

In some embodiments, in a case that a quantity of pieces of the other fourth recommended information in the collapsed display state exceeds a one-time expansion threshold n, n pieces of the latest fourth recommended information are switched from the collapsed display state to the expanded display state, n being a positive integer. n may represent different values in different embodiments Another expansion signal from a user further needs to be received to expand other remaining fourth recommended information again. For example, the one-time expansion threshold n is 3. In the expanded display state 132, the three articles liked by the user "Allenzhang" are expanded. Next, after the expansion signal is triggered again, the other remaining three pieces of fourth recommended information in the collapsed display state are re-expanded, as shown in the re-expanded state 133 in FIG. 19. In this case, the remaining 7 articles are not expanded. In different embodiments, the one-time expansion threshold n may further be 10.

In summary, according to the method provided in this embodiment, a plurality of pieces of interactive recommended information on which the second account performs a plurality of interactions (for example, frequent liking within a short time) within a short time are displayed in a collapsed manner. Adverse impact generated by a continuous interaction behavior of the second account on the first account is avoided as much as possible, and information quality of interactive recommended information displayed on an information presentation interface is improved.

In one embodiment, the recommended information flow further includes at least two pieces of fifth recommended information for which the same second account generates interactive messages but whose information quality is worse than a quality condition. When the same second account generates interactive messages (for example, like) for a plurality of pieces of low-quality information, a degree of interest of the first account in the fifth recommended information may also be correspondingly relatively poor. Quality of information may be determined according to a quality score, and information whose score is less than a preset quality score may be used as low-quality information. The quality score may be obtained according to a score provided by a user for the information. For example, a score control may be set on an article display page, a reader reading the article may score the article, and an average value of user scores is calculated as a quality score. Certainly, scores corresponding to the number of words, the level of an author, a click-through rate, and a content category are also set. Therefore, a quality score of the article may be determined according to the number of words, the level of the article author, the click-through rate, and a content category of the article. The method further includes step 219 and step 220, as shown in FIG. 20.

Step 219. Display target fifth recommended information in the at least two pieces of fifth recommended information in a normal display state in the information presentation interface, and display the other fifth recommended information other than the target fifth recommended information in the collapsed display state.

The target fifth recommended information is one or more pieces of information selected from all the fifth recommended information, and a selection condition of the target fifth recommended information may be at least one of the following: an interaction time is the latest, information quality is the highest, and a quantity of interactive messages for the second account is the largest. The normal display state may be the expanded display state.

In some embodiments, the server adds a second mark of the target fifth recommended information to the recommended information flow, so that the first terminal determines the target fifth recommended information from the at least two pieces of fifth recommended information according to the second mark.

Step 220. Switch the other fifth recommended information from the collapsed display state to an expanded display state in the information presentation interface in a case that an expansion signal for the other fifth recommended information is received.

Figure 21:
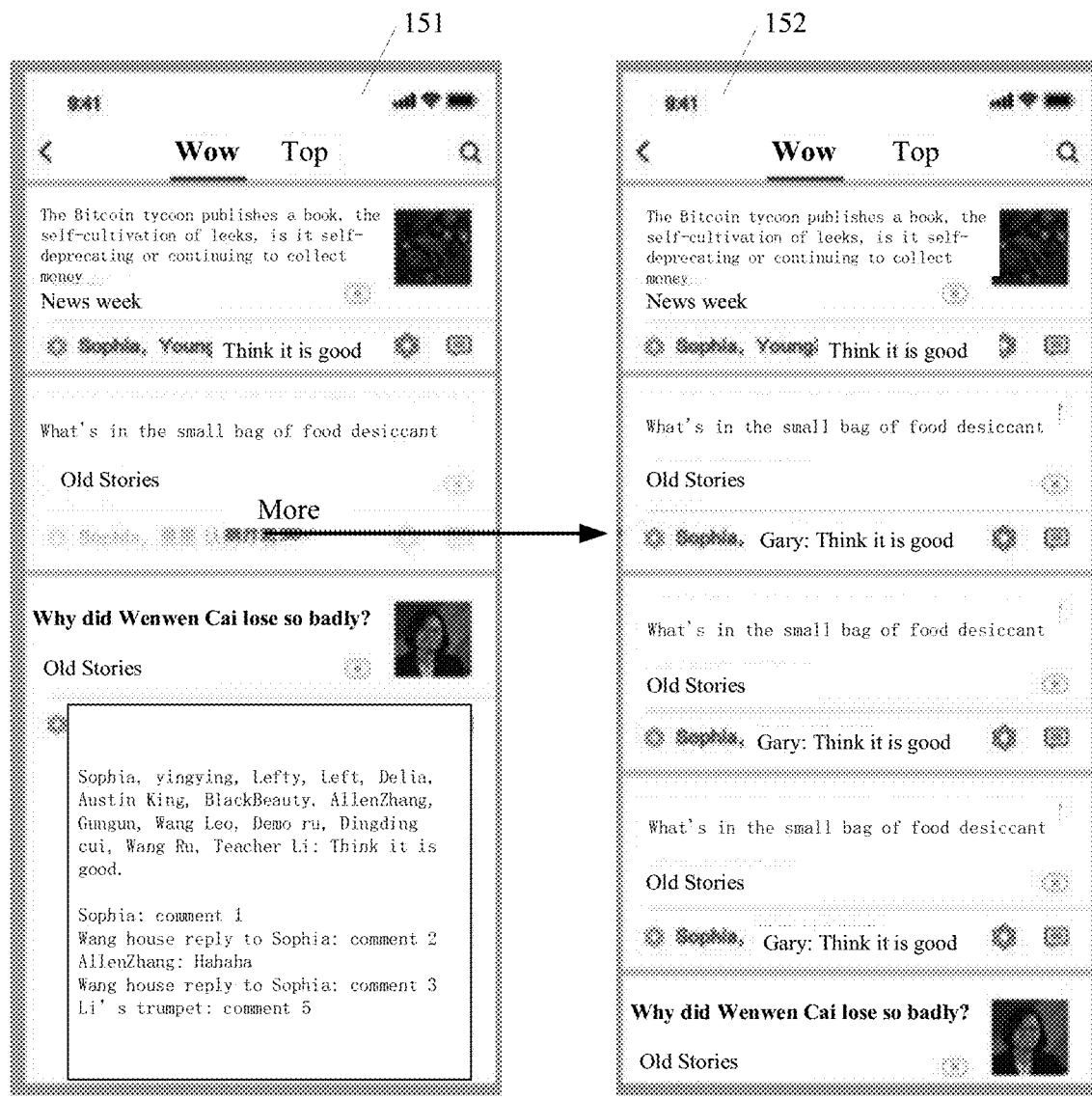
FIG. 21 is a schematic diagram of an interface of an information recommendation method according to an exemplary embodiment of this application.

Referring to FIG. 21, when the same friend user Sophia likes a plurality of low-quality articles within a short time, in an initial state 151 of the information presentation interface, a target article in the plurality of articles liked by the friend user is displayed normally in a recommended information flow. Other articles liked by the friend user are displayed in a collapsed manner in the recommended information flow. When the user taps/clicks an expansion control "More", the articles are switched from the collapsed display state to an expanded display state 152 in the information presentation interface.

In some embodiments, in a case that a quantity of pieces of the other fifth recommended information in the collapsed display state exceeds a one-time expansion threshold n, n pieces of the latest fifth recommended information are switched from the collapsed display state to the expanded display state. Another expansion signal from a user further needs to be received to expand other remaining fifth recommended information again.

In summary, according to the method provided in this embodiment, a plurality of pieces of low-quality interactive recommended information for the second account are displayed in a collapsed manner. Adverse impact generated by low-quality information on the first account is avoided as much as possible, and information quality of interactive recommended information on an information presentation interface is improved.

Figure 22:
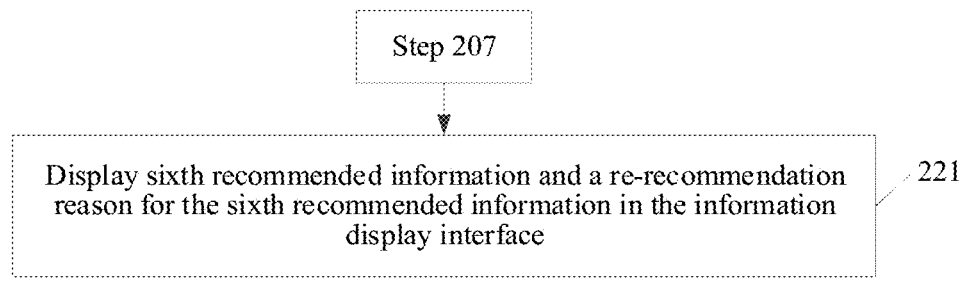
FIG. 22 is a flowchart of an information recommendation method according to an exemplary embodiment of this application.

In one embodiment, the server further adds sixth recommended information to the recommended information flow for the first account. The recommended information flow further includes: the sixth recommended information that has been historically recommended and meets a re-recommendation condition, and the re-recommendation condition includes at least one of the following conditions: there are m new interactive messages, or there are new interactive messages of k second accounts. The method further includes step 221, as shown in FIG. 22.

Step 221. Display the sixth recommended information and a re-recommendation reason for the sixth recommended information in the information presentation interface.

Regardless of historical recommended information that has been viewed by the first account or historical recommended information that has not been viewed by the first account, as long as the historical recommended information meets a re-recommendation condition (or referred to as a secondary recall condition or a secondary exposure condition), the server further adds the sixth recommended information to the recommended information flow. After receiving the sixth recommended information, the first terminal displays the sixth recommended information in the information presentation interface again.

In some embodiments, the first terminal further displays the re-recommendation reason for the sixth recommended information in the information presentation interface, and the re-recommendation reason is generated according to a specific meeting condition that the sixth recommended information meets the re-recommendation condition.

Figure 23:
FIG. 23 is a schematic diagram of an interface of an information recommendation method according to an exemplary embodiment of this application.

Referring to FIG. 23, when a large quantity of new interactive messages (for example, a new like, a new comment, or a new reply) of friend users exist in a historical recommended article, the first terminal re-displays the sixth recommended information in the information presentation interface, and displays a re-recommendation reason "New moments since the last viewing" for the sixth recommended information simultaneously.

In summary, according to the method provided in this embodiment, recommended information with a large quantity of interactive messages from friends is recalled and recommended a second time, and a probability that valuable recommended information enters the recommended information flow again can be increased, to prevent the first account from missing valuable recommended information.

Figure 24:
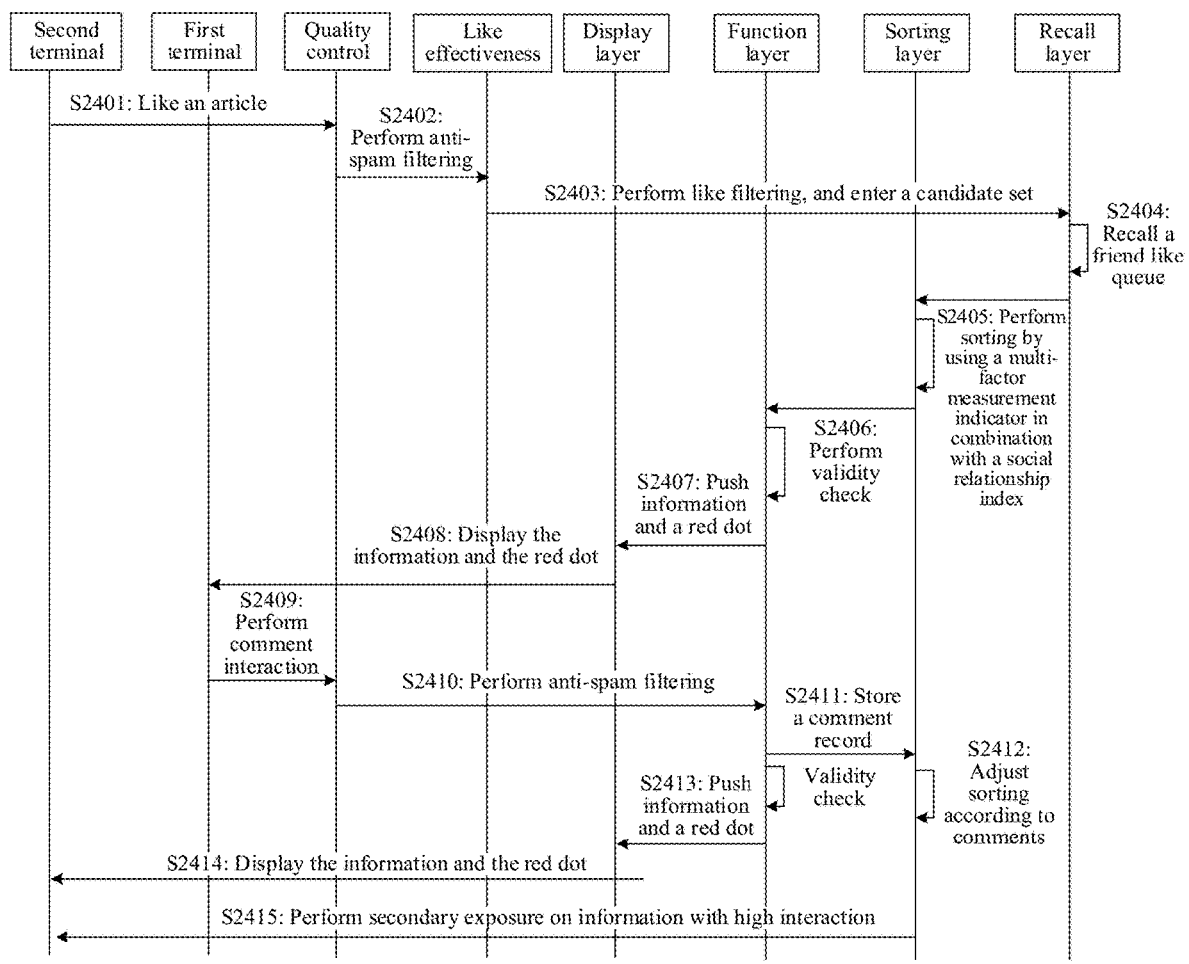
FIG. 24 is a flowchart of an information recommendation method according to an exemplary embodiment of this application.

For example, the interactive message is a like message. Assuming that the second terminal is a terminal used by a like user B, the first terminal is a terminal used by a friend A of the like user, and the server includes: functional modules such as quality control, like effectiveness, a display layer, a function layer, a sorting layer, and a recall layer. As shown in FIG. 24, the information recommendation method includes, but is not limited to, the following steps:

S2401. Like an article.

A user B likes an article on the second terminal. The second terminal reports a like behavior of the user B to the server.

S2402. Perform anti-spam filtering.

A quality control module of the server performs the anti-spam filtering on the article.

The quality control module determines whether an article is pornographic by using at least one of sensitive word filtering, semantic analysis or image recognition. When the article is pornographic, the article is prohibited from entering a next module.

When the article is not a pornographic article but is a low-quality article, the low-quality article is marked with a low-quality label, the low-quality article is transmitted to a next module.

S2403. Perform like filtering, and enter a candidate set.

A like effectiveness module of the server performs like filtering on a current like behavior. The like filtering is a filtering mechanism used for monitoring repeated liking of a plurality of articles within relatively short preset duration by the same user. When the current like behavior meets a filtering condition of the like filtering, the article is marked with a like filtering label, the article is transmitted to a next module.

S2404. Recall a friend like queue.

An article liked by the user B is put into a friend like queue of the friend A for recalling.

S2405. Perform sorting by using a multi-factor measurement indicator in combination with a social relationship index.

The recall layer performs, according to the multi-factor measurement indicator of the social relationship index, sorting on a plurality of articles meeting a recall condition of the friend A.

In some embodiments, the sorting layer extracts factors such as interaction frequency, social influence, and popularity in a circle having an obvious social characteristic by using a social interaction behavior between users, and enables the factors to participate in calculation of a sorting indicator, so that displayed information sorting has a social attribute.

In some embodiments, after a recommendation score of each recalled article is obtained according to the multi-factor measurement indicator of the social relationship index, a predetermined quantity of recommended articles are transmitted to the function layer in descending order of recommendation score.

S2406. Perform validity check.

The function layer performs validity check on the predetermined quantity of recommended articles, and the validity check is a detection mechanism used for detecting whether a recommended article can be accessed normally.

When the predetermined quantity of recommended articles is valid, the function layer transmits the predetermined quantity of recommended articles to the display layer.

S2407. Push information and a red dot.

The display layer pushes the predetermined quantity of recommended articles to a first terminal of the friend A. In some embodiments, for the red dot, a current push is prompted to the friend A in the form of a red dot in at least one location in an icon of an application program or a home page of the first terminal.

S2408. Display the information and the red dot.

The first terminal displays the predetermined quantity of recommended articles. For example, the first terminal prompts a recommended article of a current push in the form of a red dot in at least one location in an icon of an application program or a home page.

S2409. Perform comment interaction.

The first terminal displays the recommended article on an information presentation interface of the application program, and the friend A may perform at least one interaction of liking, commenting on or replying to a comment on the recommended article on the information presentation interface of the application program.

The first terminal reports the new interactive message to the server.

S2410. Perform anti-spam filtering.

The quality control of the server performs the anti-spam filtering on the interactive message.

S2411. Store a comment record.

When the anti-spam filtering is performed on an interactive message, the function layer of the server stores the interactive message.

S2412. Adjust sorting according to comments.

The sorting layer of the server adjusts a sorting position of corresponding recommended information in a recommended information flow according to a new interactive message.

S2413. Push information and a red dot.

The function layer of the server transmits the new interactive message to the display layer, and the display layer pushes the new interactive message to a second terminal of the user B.

S2414. Display the information and the red dot.

The second terminal displays the new interactive message in the information presentation interface. In some embodiments, a current push is prompted to the user B in the form of a red dot at an icon of an application program and/or a home page on the second terminal.

S2415. Perform secondary exposure on information with high interaction.

When the new interactive message enables the recommended information to meet a secondary exposure condition, the server may further recommend the recommended information to the friend A in a secondary exposure form.

Figure 25:
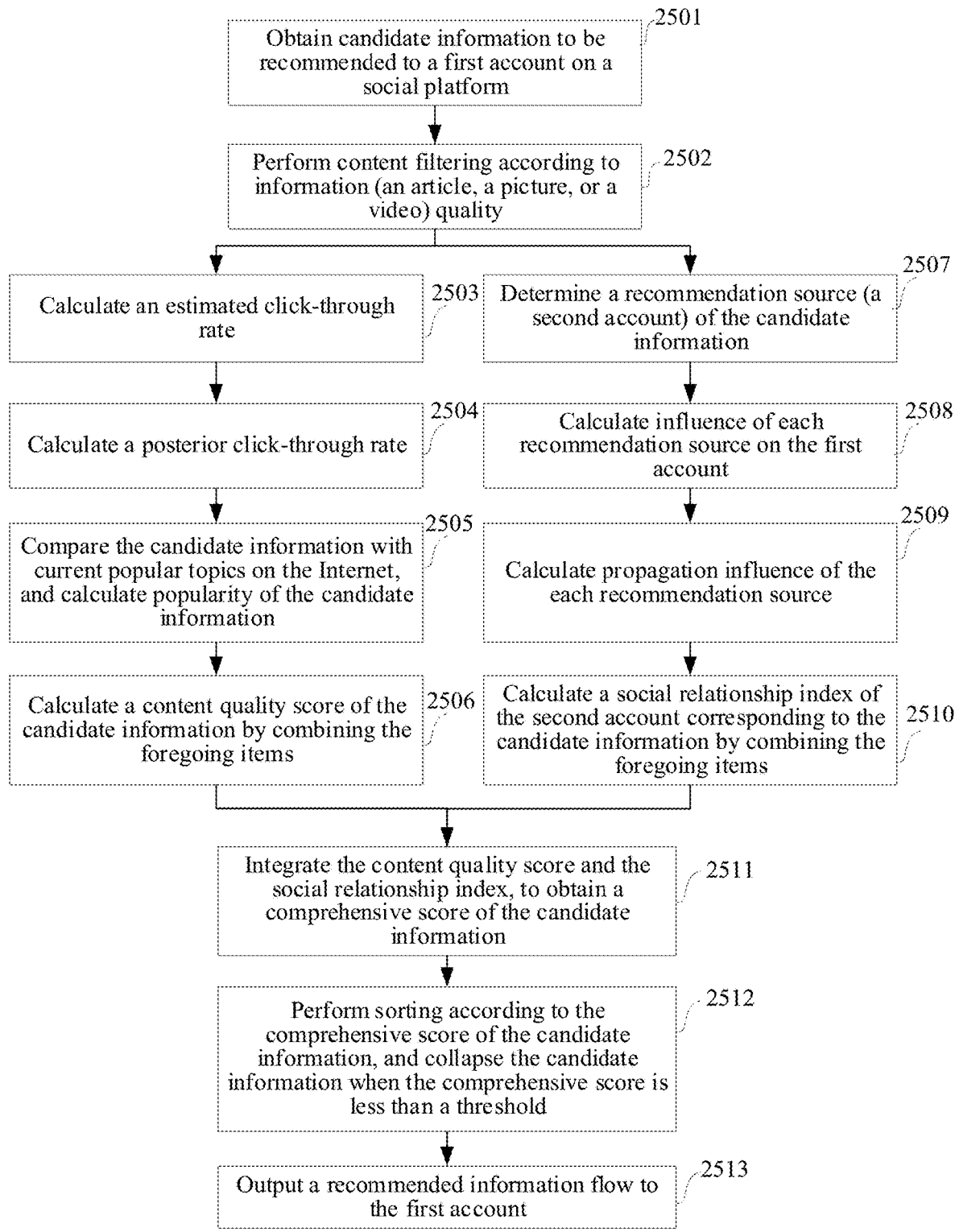
FIG. 25 is a flowchart of an information recommendation method according to an exemplary embodiment of this application.

For example, as shown in FIG. 25, the server may generate a recommended information flow for the first account by comprehensively considering content quality of information and a social relationship index. A recommendation process on the server side may include, for example, the following steps:

Step 2501. The server obtains candidate information to be recommended to a first account on a social platform.

In some embodiments, the server determines information for which a friend account (a second account) of the first account generates an interactive message as candidate information to be recommended to the first account.

Step 2502. The server performs information filtering according to information (an article, a picture or a video) quality.

The information quality may be calculated according to a parameter such as a click-through rate, a like rate or a forwarding rate. The server performs the information filtering on obviously low-quality or pornographic information.

Step 2503. The server calculates an estimated click-through rate.

The server calculates an estimated click-through rate of each piece of candidate information.

Step 2504. The server calculates a posterior click-through rate.

The server calculates a posterior click-through rate of each piece of candidate information.

Step 2505. The server compares the candidate information with current popular topics on the Internet, and calculates popularity of the candidate information.

Step 2506. The server calculates a content quality score of the candidate information by combining the foregoing items (the estimated click-through rate, the posterior click-through rate, and the popularity).

Step 2507. The server determines a recommendation source of the candidate information.

In some embodiments, the recommendation source of the candidate information is the second account.

Step 2508. The server calculates interactive influence of each recommendation source on the first account.

Step 2509. The server calculates propagation influence of each recommendation source.

Step 2510. The server calculates a social relationship index of the second account corresponding to the candidate information by combining the foregoing items (the influence on the first account and the propagation influence).

Step 2511. The server integrates the content quality score and the social relationship index, to obtain a comprehensive score of the candidate information.

Step 2512. The server performs sorting according to the comprehensive score of the candidate information, and collapses the candidate information when the comprehensive score is less than a threshold.

Step 2513. The server outputs a recommended information flow to the first account.

In summary, according to the method provided in this embodiment, a comprehensive score of candidate information can be obtained by combining a content quality score of the candidate information and a social relationship index, sorting is performed according to the comprehensive score of the candidate information, and a recommended information flow is outputted to the first account, so that the first account can obtain recommended information with relatively high information quality and a relatively high social relationship index, thereby improving information quality of the recommended information flow outputted by the first account.

It is to be understood that the steps in the embodiments of this application are not necessarily performed according to a sequence indicated by step numbers. Unless otherwise explicitly specified in this specification, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages for another step.

Apparatus embodiments of this application are described below, and may be used to perform the method embodiments of this application. For details not disclosed in the apparatus embodiments of this application, reference is made to the method embodiments of this application.

Figure 26:
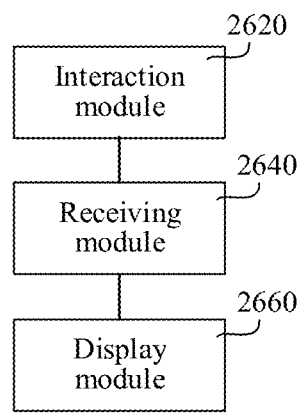
FIG. 26 is a block diagram of an information recommendation apparatus according to an exemplary embodiment of this application.

FIG. 26 is a block diagram of an information recommendation apparatus according to an exemplary embodiment of this application. The apparatus may be implemented as the entire or a part of a terminal by using software, hardware, or a combination thereof. The apparatus includes:

an interaction module 2620, configured to start an application program according to a start operation, a first account being logged in in the application program;

a receiving module 2640, configured to obtain a recommended information flow for the first account, at least one piece of interactive recommended information existing in recommended information in the recommended information flow, the interactive recommended information being information for which a second account generates an interactive message, a social relationship existing between the second account and the first account; and a display module 2660, configured to display an information presentation interface, the information presentation interface including the recommended information displayed in an information flow form.

In one embodiment, the interactive message includes at least one of a like message, a comment message or a comment reply message.

In one embodiment, the display module 2660 is configured to display a function entry interface, a function entry control of the information presentation interface being displayed on the function entry interface, a new information notification being displayed on the function entry control.

The display module 2660 is configured to jump from the function entry interface to the information presentation interface for display in a case that a first trigger signal for the function entry control is received.

In one embodiment, the information presentation interface includes a first tab and a second tab, and either of the first tab and the second tab is used for displaying the interactive recommended information.

The display module 2660 is configured to: jump from the function entry interface to the first tab of the information presentation interface for display, a label of the second tab being further displayed on the first tab; and switch from the first tab to the second tab in the information presentation interface for display in a case that a trigger signal corresponding to the label of the second tab is received.

In one embodiment, the information presentation interface includes at least two pieces of interactive recommended information in a collapsed display state. The display module 2660 is configured to: switch from the function entry interface to the information presentation interface, an expansion control for the at least two pieces of interactive recommended information being displayed on the information presentation interface; and display the at least two pieces of interactive recommended information on the information presentation interface in the information flow form in a case that a trigger signal corresponding to the expansion control is received.

In one embodiment, account information of the second account is displayed at a recommendation source location of at least one piece of interactive recommended information.

In one embodiment, a sorting position of the interactive recommended information is in a positive correlation with a social relationship index, and the social relationship index is an index used for measuring the social relationship between the first account and the second account.

In one embodiment, the social relationship index is obtained through calculation according to at least two social parameters.

The at least two social parameters include at least two of interaction frequency, propagation influence in a social relationship chain or popularity in a circle.

In one embodiment, an interactive message display area of the interactive recommended information is further displayed in the information presentation interface, and the interactive message display area is a partial area used for displaying an interactive message for the interactive recommended information in the information presentation interface.

The receiving module 2640 is configured to receive an interactive operation in the interactive message display area; and the display module 2660 is configured to generate the interactive message for the interactive recommended information according to the interactive operation, the interactive message including at least one of a like message, a comment message or a comment reply message.

In one embodiment, the interactive recommended information includes first recommended information.

The receiving module 2640 is configured to receive a new interactive message transmitted by a server for the first recommended information, the new interactive message including at least one of a like message, a comment message or a comment reply message of the second account for the first recommended information after a previous push.

The display module 2660 is configured to: display a notification of the new interactive message on the information presentation interface; and display an interactive message display area of the first recommended information according to the new interactive message after a second trigger signal for the notification is received.

In one embodiment, the first recommended information is recommended information for which the first account has generated a historical interactive message; or the first recommended information is recommended information for which both the first account and the second account have generated historical interactive messages.

In one embodiment, the display module 2660 is configured to: determine, in a case that a quantity of the historical interactive messages and new interactive messages for the first recommended information is greater than a preset quantity, target interactive messages whose quantity exceeds the preset quantity in the historical interactive messages and the new interactive messages, and display the target interactive messages in the collapsed display state in the interactive message display area; and switch the target interactive message from the collapsed display state to an expanded display state in the interactive message display area in a case that an expansion signal for the target interactive message is received.

In one embodiment, the interactive recommended information further includes second recommended information for which the first account generates an interactive message in another interface.

Another interface is an interface other than the information presentation interface in the application program, and/or another interface is an interface in another application program that has an exchange relationship with the application program.

In one embodiment, the display module 2660 is further configured to: display, in a case that a quantity of pieces of second recommended information exceeds a preset quantity, target second recommended information whose quantity of pieces exceeds the preset quantity in the collapsed display state in the information presentation interface; and switch the target second recommended information from the collapsed display state to an expanded display state in the information presentation interface in a case that an expansion signal for the target second recommended information is received.

In one embodiment, the recommended information flow further includes third recommended information that is set to be read later in another interface by the first account.

Another interface is an interface other than the information presentation interface in the application program, and/or another interface is an interface in another application program that has an exchange relationship with the application program.

In one embodiment, the display module 2660 is further configured to collapse interactive recommended information from the same second account for display in the information presentation interface.

In one embodiment, the interactive recommended information includes at least two pieces of fourth recommended information for which the same second account generates interactive messages within preset duration. The display module is further configured to: display target fourth recommended information in the at least two pieces of fourth recommended information in a normal display state in the information presentation interface, and display the other fourth recommended information other than the target fourth recommended information in the collapsed display state; and switch the other fourth recommended information from the collapsed display state to an expanded display state in the information presentation interface in a case that an expansion signal for the other fourth recommended information is received.

In one embodiment, the display module 2660 is further configured to switch, in a case that a quantity of pieces of the other fourth recommended information in the collapsed display state exceeds a one-time expansion threshold n, n pieces of the latest fourth recommended information from the collapsed display state to the expanded display state.

In one embodiment, the interactive recommended information includes at least two pieces of fifth recommended information for which the same second account generates interactive messages but whose information quality is worse than a quality condition. The display module 2660 is further configured to: display target fifth recommended information in the at least two pieces of fifth recommended information in a normal display state in the information presentation interface, and display the other fifth recommended information other than the target fifth recommended information in the collapsed display state; and switch the other fifth recommended information from the collapsed display state to an expanded display state in the information presentation interface in a case that an expansion signal for the other fifth recommended information is received.

In one embodiment, the display module 2660 is further configured to switch, in a case that a quantity of pieces of the other fifth recommended information in the collapsed display state exceeds a one-time expansion threshold n, n pieces of the latest fifth recommended information from the collapsed display state to the expanded display state.

In one embodiment, the recommended information flow further includes sixth recommended information that has been historically recommended and meets a re-recommendation condition.

The re-recommendation condition includes that: there are m new interactive messages, and/or there are new interactive messages of k second accounts, both m and k being positive integers.

In one embodiment, the display module 2660 is further configured to display the sixth recommended information and a re-recommendation reason for the sixth recommended information in the information presentation interface.

Figure 27:
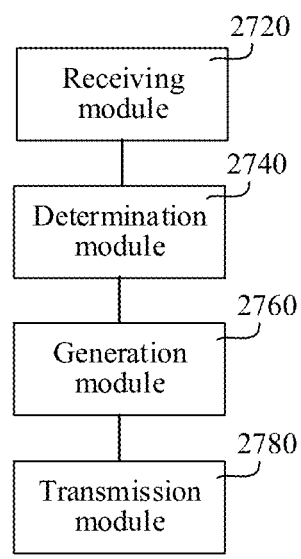
FIG. 27 is a block diagram of an information recommendation apparatus according to an exemplary embodiment of this application.

FIG. 27 is a block diagram of an information recommendation apparatus according to an exemplary embodiment of this application. The apparatus may be implemented as the entire or a part of a terminal by using software, hardware, or a combination thereof. The apparatus includes:

a receiving module 2720, configured to receive interactive messages generated by accounts for information;

a determination module 2740, configured to determine a second account having a social relationship with a first account;

a generation module 2760, configured to generate at least one piece of interactive recommended information for the first account according to the information for which the second account generates the interactive message; and a transmission module 2780, configured to transmit a recommended information flow for the first account to a first terminal, recommended information in the recommended information flow including the at least one piece of interactive recommended information.

In one embodiment, the interactive message includes at least one of a like message, a comment message or a comment reply message.

In one embodiment, the generation module 2760 is configured to: determine the information for which the second account generates the interactive message as a candidate information set; for each piece of candidate information in the candidate information set, calculate a recommendation score of the candidate information according to a social relationship index between the first account and the second account corresponding to the candidate information; and generate candidate information whose recommendation scores rank top n as the interactive recommended information for the first account, the social relationship index being an index used for measuring the social relationship between the first account and the second account.

In one embodiment, the generation module 2760 is further configured to determine a sorting position of the interactive recommended information in the recommended information flow according to the social relationship index between the first account and the second account corresponding to the interactive recommended information, the sorting position of the interactive recommended information being in a positive correlation with the social relationship index.

In one embodiment, the social relationship index is obtained through calculation according to at least two social parameters.

The at least two social parameters include at least two of interaction frequency, propagation influence in a social relationship chain or popularity in a circle.

In one embodiment, the generation module 2760 is further configured to add recommended information obtained by performing information recommendation by using another recommendation algorithm to the recommended information flow for the first account. Another recommendation algorithm is an information recommendation algorithm other than a recommendation algorithm based on a social relationship index.

In one embodiment, the transmission module 2780 is further configured to push a new interactive message for the first recommended information to the first terminal, the new interactive message including at least one of a like message, a comment message or a comment reply message of the second account for the first recommended information after a previous push.

In one embodiment, the generation module 2760 is further configured to add the interactive message for the first recommended information to the recommended information flow for the first account.

In one embodiment, the generation module 2760 is further configured to add second recommended information to the recommended information flow for the first account, the second recommended information being information for which the first account generates an interactive message in another interface. Another interface is an interface different from the information presentation interface, for example, an interface in which a friend shares information, an interface of subscription information, and a user interface of another application program that exchanges information with the application program.

In one embodiment, the generation module 2760 is further configured to add third recommended information to the recommended information flow for the first account, the third recommended information being information that is set to be read later in another interface by the first account. Another interface is an interface different from the information presentation interface, for example, an interface in which a friend shares information, an interface of subscription information, and a user interface of another application program that exchanges information with the application program.

In one embodiment, the generation module 2760 is further configured to: select target fourth recommended information from at least two pieces of fourth recommended information, and add a first mark of the target fourth recommended information to the recommended information flow.

In one embodiment, the generation module 2760 is further configured to: select target fifth recommended information from at least two pieces of fifth recommended information, and add a second mark of the target fifth recommended information to the recommended information flow.

When providing a recommended information flow to a first account, the information recommendation apparatus and a terminal provided in the foregoing embodiments are merely described by using an example of division of the foregoing functional modules. During actual application, the foregoing functions may be allocated to different functional modules to be completed according to a requirement, that is, an inner structure of the device is divided into different functional modules to complete all or some of the functions described above. In addition, the information recommendation apparatus provided in the foregoing embodiment belongs to the same concept as the embodiment of the information recommendation method. For a specific implementation process of the apparatus, reference is made to the method embodiment, and details are not described herein again.

Figure 28:
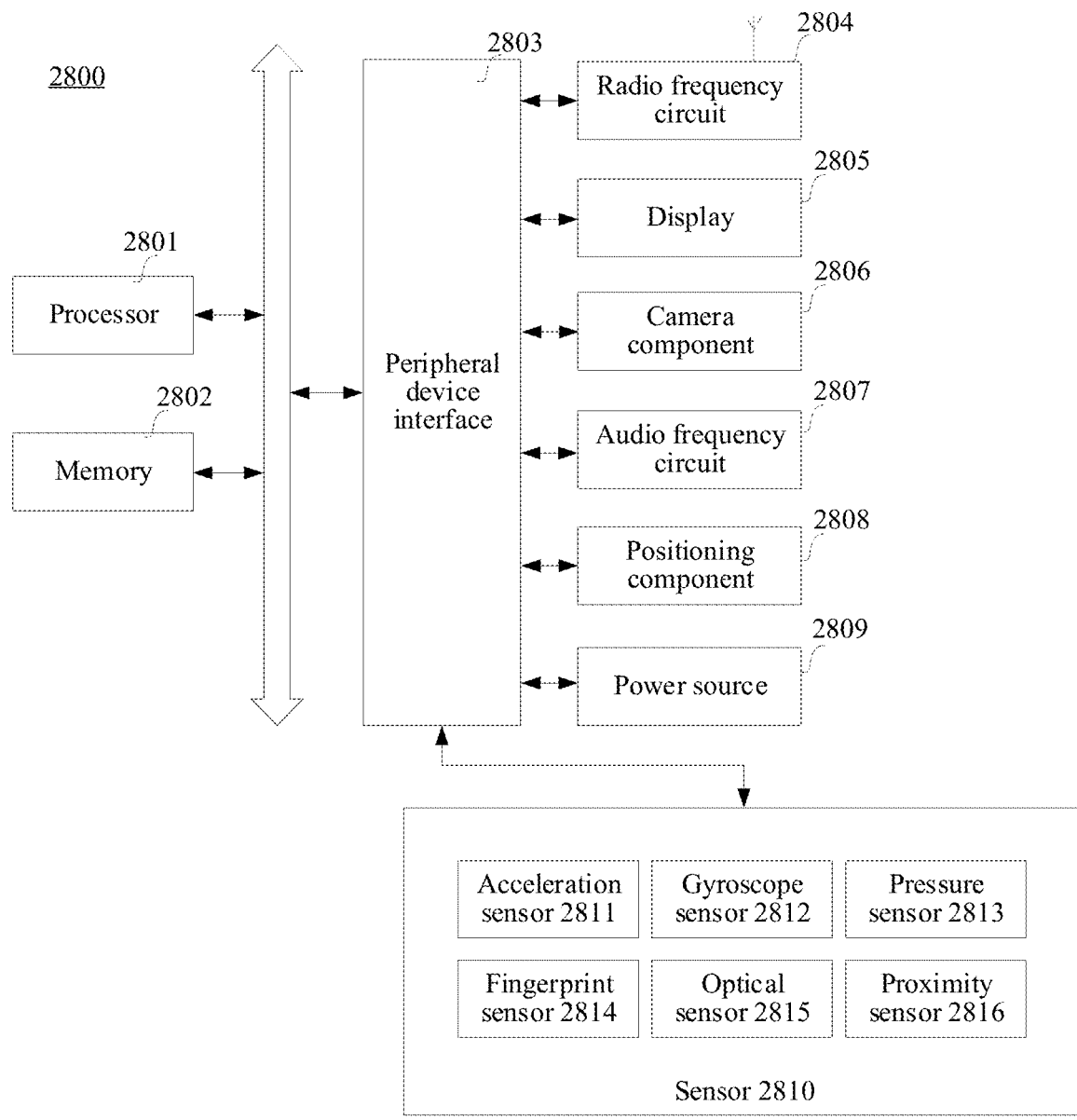
FIG. 28 is a block diagram of a mobile terminal according to an exemplary embodiment of this application.

FIG. 28 is a structural block diagram of a terminal 2800 according to an exemplary embodiment of this application. The terminal 2800 may be a smartphone, a tablet computer, a moving picture experts group audio layer III (MP3) player, a moving picture experts group audio layer IV (MP4) player, a notebook computer, or a desktop computer. The terminal 2800 may also be referred to other names such as a user device, a portable terminal, a laptop terminal, or a desktop terminal.

Generally, the terminal 2800 includes a processor 2801 and a memory 2802.

The processor 2801 includes one or more processing cores, for example, a 4-core processor or an 8-core processor. The processor 2801 may be implemented by at least one hardware form of a digital signal processor (DSP), a field-programmable gate array (FPGA), and a programmable logic array (PLA). The processor 2801 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 2801 may be integrated with a graphics processing unit (GPU). The GPU is configured to render and draw information that needs to be displayed on a display. In some embodiments, the processor 2801 may further include an artificial intelligence (AI) processor. The AI processor is configured to process a computing operation related to machine learning.

The memory 2802 may include one or more computer-readable storage media. The computer-readable storage media may be non-transient. The memory 2802 may further include a high-speed random access memory (RAM), and a non-volatile memory such as one or more magnetic disk storage devices and a flash memory device. In some embodiments, the non-transitory computer-readable storage medium in the memory 2802 is configured to store at least one instruction, and the at least one instruction is configured to be executed by the processor 2801 to implement the information recommendation method provided in the method embodiments of this application.

In some embodiments, the terminal 2800 may alternatively include: a peripheral device interface 2803 and at least one peripheral device. The processor 2801, the memory 2802, and the peripheral device interface 2803 may be connected through a bus or a signal cable. Each peripheral device may be connected to the peripheral device interface 2803 through a bus, a signal cable, or a circuit board. Specifically, the peripheral device includes at least one of a radio frequency circuit 2804, a touch display 2805, a camera 2806, an audio frequency circuit 2807, a positioning component 2808, and a power source 2809.

The peripheral device interface 2803 may be configured to connect at least one peripheral device related to input/output (I/O) to the processor 2801 and the memory 2802. In some embodiments, the processor 2801, the memory 2802, and the peripheral device interface 2803 are integrated into the same chip or circuit board. In some other embodiments, any one or two of the processor 2801, the memory 2802, and the peripheral device interface 2803 may be implemented on an independent chip or circuit board, and the implementation is not limited in this embodiment.

The radio frequency circuit 2804 is configured to receive and transmit a radio frequency (RF) signal, also referred to as an electromagnetic signal. The radio frequency circuit 2804 communicates with a communication network and other communication devices by using the electromagnetic signal. The radio frequency circuit 2804 may convert an electric signal into an electromagnetic signal for transmission, or convert a received electromagnetic signal into an electric signal. In some embodiments, the radio frequency circuit 2804 includes an antenna system, an RF transceiver, one or more amplifiers, a tuner, an oscillator, a digital signal processor, a codec chip set, a subscriber identity module card, and the like. The radio frequency circuit 2804 may communicate with another terminal by using a wireless communications protocol. The wireless communication protocol includes, but is not limited to, a metropolitan area network, generations for mobile communication networks (2G, 3G, 4G, and 5G), a wireless partial area network, and/or a wireless fidelity (Wi-Fi) network. In some embodiments, the radio frequency circuit 2804 may also include a circuit related to near field communication (NFC). This is not limited in this application.

The display screen 2805 is configured to display a user interface (UI). The UI may include a graphic, a text, an icon, a video, and any combination thereof. When the display screen 2805 is a touch screen, the display screen 2805 is further capable of collecting a touch signal on or over a surface of the display screen 2805. The touch signal may be inputted into the processor 2801 as a control signal for processing. In this case, the display screen 2805 may be further configured to provide a virtual button and/or a virtual keyboard, also referred to as a soft button and/or a soft keyboard. In some embodiments, there is one display screen 2805, disposed on a front panel of the terminal 2800. In some other embodiments, there may be two display screens 2805, respectively disposed on different surfaces of the terminal 2800 or designed in a foldable shape. In still some other embodiments, the display screen 2805 may be a flexible display screen, disposed on a curved surface or a folded surface of the terminal 2800. Even, the display screen 2805 may be further set to have a non-rectangular irregular graph, that is, a special-shaped screen. The display screen 2805 may be manufactured by using a material such as a liquid crystal display (LCD), an organic light-emitting diode (OLED), or the like.

The camera component 2806 is configured to collect an image or a video. In some embodiments, the camera component 2806 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera assembly 2806 may further include a flash. The flash may be a single color temperature flash or a double color temperature flash. The double color temperature flash is a combination of a warm flash and a cold flash, and may be configured to perform light ray compensation at different color temperatures.

The audio circuit 2807 may include a microphone and a loudspeaker. The loudspeaker is configured to collect sound waves of a user and an environment, and convert the sound waves into electric signals and input the electrical signals into the processor 2801 for processing, or input the electrical signals into the radio frequency circuit 2804 to implement speech communication. For the purpose of stereo sound collection or noise reduction, there may be a plurality of microphones, respectively disposed at different parts of the terminal 2800. The microphone may be further a microphone array or an omnidirectional collection microphone. The loudspeaker is configured to convert electric signals from the processor 2801 or the radio frequency circuit 2804 into sound waves. The loudspeaker may be a conventional thin-film loudspeaker or a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 2807 may further include an earphone jack.

The positioning component 2808 is configured to position a current geographic location of the terminal 2800, to implement a navigation or a location based service (LBS). The positioning component 2808 may be a positioning component based on a global positioning system (GPS) of the United States, a COMPASS System of China, a GLONASS System of Russia, or a GALILEO System of the European Union.

The power supply 2809 is configured to supply power to components in the terminal 2800. The power supply 2809 may be an alternating current, a direct current, a primary battery, or a rechargeable battery. When the power source 2809 includes the rechargeable battery, the rechargeable battery may be a wired rechargeable battery or a wireless rechargeable battery. The rechargeable battery may be further configured to support a fast charge technology.

In some embodiments, the terminal 2800 further includes one or more sensors 2810. The one or more sensors 2810 include, but are not limited to, an acceleration sensor 2811, a gyroscope sensor 2812, a pressure sensor 2813, a fingerprint sensor 2814, an optical sensor 2815, and a proximity sensor 2816.

The acceleration sensor 2811 may detect acceleration on three coordinate axes of a coordinate system established by the terminal 2800. For example, the acceleration sensor 2811 may be configured to detect components for gravity acceleration on the three coordinate axes. The processor 2801 may control, according to a gravity acceleration signal collected by the acceleration sensor 2811, the display screen 2805 to display the user interface in a frame view or a portrait view. The acceleration sensor 2811 may further be configured to collect motion data of a game or a user.

The gyroscope sensor 2812 may detect a body direction and a rotation angle of the terminal 2800. The gyroscope sensor 2812 may cooperate with the acceleration sensor 2811 to collect a 3D action by the user on the terminal 2800. The processor 2801 may implement the following functions according to data collected by the gyroscope sensor 2812: motion sensing (for example, the UI is changed according to a tilt operation of the user), image stabilization during shooting, game control, and inertial navigation.

The pressure sensor 2813 may be disposed on a side frame of the terminal 2800 and/or a lower layer of the display screen 2805. When the pressure sensor 2813 is disposed on the side frame of the terminal 2800, a holding signal of the user on the terminal 2800 may be detected. The processor 2801 performs left and right hand recognition or a quick operation according to the holding signal collected by the pressure sensor 2813. When the pressure sensor 2813 is disposed on the low layer of the display screen 2805, the processor 2801 controls, according to a pressure operation of the user on the display screen 2805, an operable control on the UI. The operable control includes at least one of a button control, a scroll bar control, an icon control, and a menu control.

The fingerprint sensor 2814 is configured to collect a fingerprint of the user. The processor 2801 identifies an identity of the user according to the fingerprint collected by the fingerprint sensor 2814, or the fingerprint sensor 2814 identifies an identity of the user according to the collected fingerprint. When the identity of the user is identified as a trusted identity, the processor 2801 authorizes the user to perform a related sensitive operation. The sensitive operation includes unlocking a screen, viewing encrypted information, downloading software, payment, changing settings, and the like. The fingerprint sensor 2814 may be disposed on a front face, a back face, or a side face of the terminal 2800. When a physical button or a vendor logo is disposed on the terminal 2800, the fingerprint sensor 2814 may be integrated with the physical button or the vendor logo.

The optical sensor 2815 is configured to collect ambient light intensity. In an embodiment, the processor 2801 may control display luminance of the display screen 2805 according to the ambient light intensity collected by the optical sensor 2815. Specifically, when the ambient light intensity is relatively high, the display luminance of the display screen 2805 is increased. When the ambient light intensity is relatively low, the display luminance of the display screen 2805 is reduced. In another embodiment, the processor 2801 may further dynamically adjust shooting parameters of the camera component 2806 according to the ambient light intensity collected by the optical sensor 2815.

The proximity sensor 2816, also referred to as a distance sensor, is usually disposed on the front panel of the terminal 2800. The proximity sensor 2816 is configured to collect a distance between a front face of the user and the front face of the terminal 2800. In an embodiment, when the proximity sensor 2816 detects that the distance between the front face of the user and the front face of the terminal 2800 is gradually decreased, the processor 2801 controls the display screen 2805 to switch from a screen-on state to a screen-off state. When the proximity sensor 2816 detects that the distance between the front face of the user and the front face of the terminal 2800 is gradually increased, the processor 2801 controls the display screen 2805 to switch from the screen-off state to the screen-on state.

Figure 29:
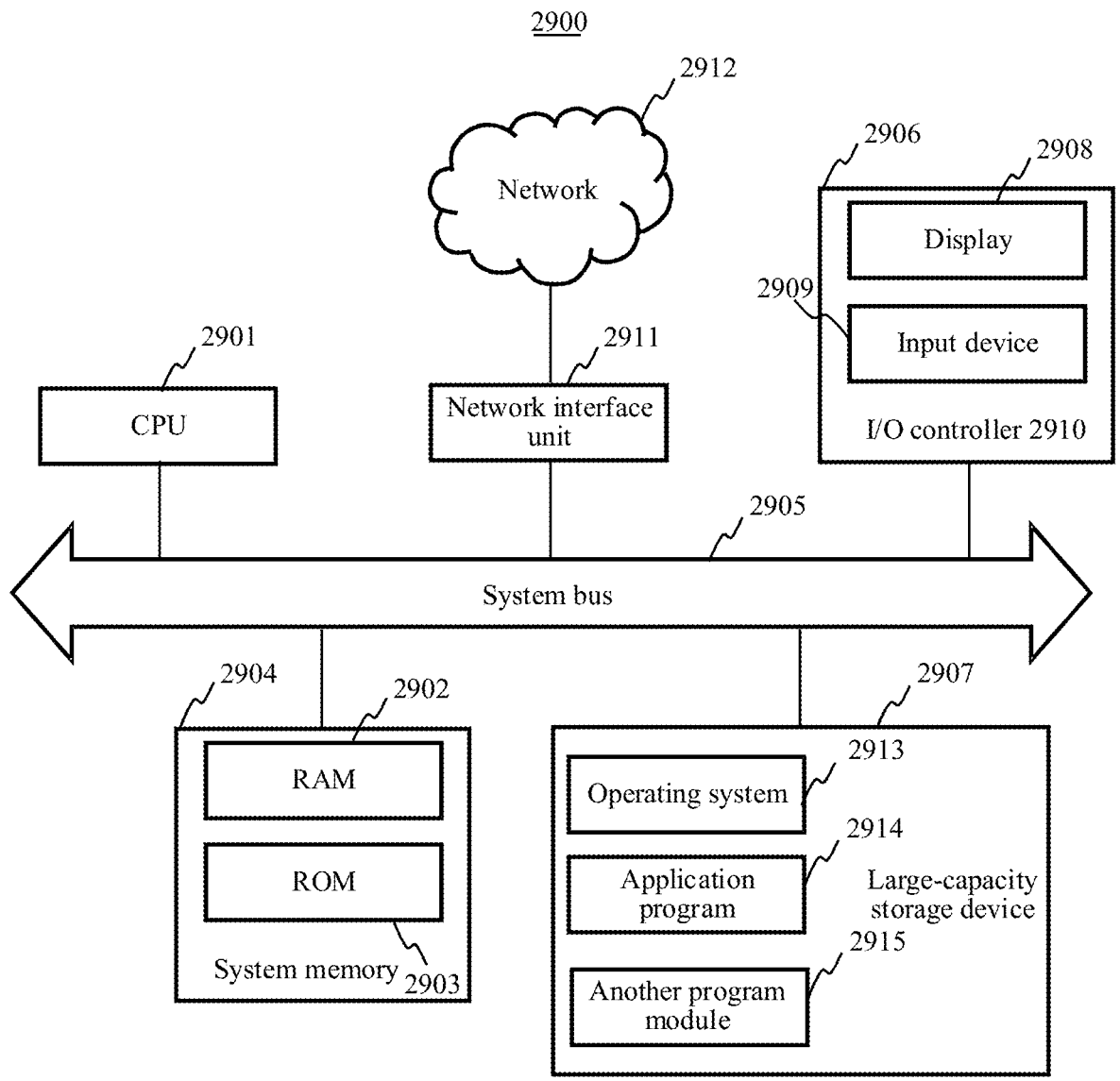
FIG. 29 is a block diagram of a server according to an exemplary embodiment of this application.

A person skilled in the art may understand that the structure shown in FIG. 28 does not constitute a limitation to the terminal 2800, and the terminal may include more components or fewer components than those shown in the figure, or some components may be combined, or a different component deployment may be used FIG. 29 is a schematic structural diagram of a server according to an embodiment of this application. The server is configured to implement the information recommendation method provided in the foregoing embodiments. Specifically:

The server 2900 includes a CPU 2901, a system memory 2904 including a RAM 2902 and a read-only memory (ROM) 2903, and a system bus 2905 connecting the system memory 2904 and the CPU 2901. The server 2900 further includes a basic input/output system (BIOS) 2906 for transmitting information between components in a computer, and a large-capacity storage device 2907 configured to store an operating system 2913, an application program 2914, and another program module 2915.

The BIOS 2906 includes a display 2908 configured to display information and an input device 2909 such as a mouse or a keyboard that is used for inputting information by a user. The display 2908 and the input device 2909 are both connected to the CPU 2901 by using an input and output controller 2910 connected to the system bus 2905. The BIOS 2906 may further include the I/O controller 2910, to receive and process inputs from a plurality of other devices, such as the keyboard, the mouse, or an electronic stylus. Similarly, the I/O controller 2910 further provides an output to a display, a printer or another type of output device.

The mass storage device 2907 is connected to the CPU 2901 by using a mass storage controller (not shown) connected to the system bus 2905. The large-capacity storage device 2907 and an associated computer-readable medium provide non-volatile storage for the server 2900. That is, the mass storage device 2907 may include a computer readable medium (not shown), such as a hard disk or a CD-ROM drive.

In some embodiments of the present disclosure, a functional unit or a functional module refers to one or more computer programs that are stored in computer readable medium. When executed by one or more processors, the computer programs may implement the functions of the corresponding functional module or functional unit. In some embodiments, a functional unit or a functional module may be implemented as a combination of software and hardware components. The software and hardware components may execute certain computer programs to implement the functions of the corresponding functional module or functional unit. In some embodiments, the hardware components include one or more processors, or one or more processors and memory.

In general, the computer-readable medium may include a computer storage medium and a communications medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, a person skilled in the art may know that the computer storage medium is not limited to the foregoing types. The system memory 2904 and the mass storage device 2907 may be collectively referred to as a memory.

According to various embodiments of this application, the server 2900 may further be connected, by using a network such as the Internet, to a remote computer on the network and run. That is, the server 2900 may be connected to a network 2912 by using a network interface unit 2911 connected to the system bus 2905, or may be connected to another type of network or remote computer system (not shown) by using the network interface unit 2911.

The memory further includes one or more programs. The one or more programs are stored in the memory and configured to be executed by one or more processors. The one or more programs contain instructions used for implementing the foregoing information recommendation method.

It is to be understood that "a plurality of" mentioned in the specification means two or more. "And/or" describes an association relationship for describing associated objects and represents that three relationships may exist. For example, A and/or B may represent the following three cases: Only A exists, both A and B exist, and only B exists. The character "I" in this specification generally indicates an "or" relationship between the associated objects.

The sequence numbers for the foregoing embodiments of this application are merely for illustrative purposes, and are not intended to indicate priorities of the embodiments.

A person of ordinary skill in the art may understand that all or some of the steps in the embodiments may be implemented by hardware or a program instructing related hardware. The program may be stored in a computer-readable storage medium. The storage medium may be a ROM, a magnetic disk, or an optical disc.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. An information recommendation method, performed by a terminal, the method comprising:
   starting an application program according to a start operation, a first account being logged in in the application program;
   obtaining a recommended information flow for the first account, recommended information in the recommended information flow including at least one piece of interactive recommended information, the interactive recommended information being information for which a second account generates an interactive message, the first account and the second account having a social relationship; and
      displaying an information presentation interface, the information presentation interface comprising the recommended information displayed in an information flow form,
      wherein:
      the recommended information flow comprises a piece of re-recommended information that has been historically recommended and meets a re-recommendation condition;
      the re-recommendation condition comprises at least one of: m new interactive messages that have been generated, by one or more accounts having a social relationship with the first account, since the piece of information was previously recommended, or new interactive messages of k second accounts have been generated since the piece of information was previously recommended, both m and k being positive integers; and
      the method further comprises: displaying the piece of re-recommended information and a re-recommendation reason in the information display interface.

2. The method according to claim 1, wherein before the displaying an information presentation interface, the method further comprises:
   displaying a function entry interface, a function entry control of the information presentation interface being displayed on the function entry interface, a new information notification being displayed on the function entry control; and
   the displaying an information presentation interface comprises:
   jumping from the function entry interface to the information presentation interface for display when a first trigger signal for the function entry control is received.

3. The method according to claim 2, wherein the information presentation interface comprises a first tab and a second tab, and either of the first tab and the second tab is used for displaying the interactive recommended information; and
   the jumping from the function entry interface to the information presentation interface for display comprises:
   jumping from the function entry interface to the first tab of the information presentation interface for display, a label of the second tab being further displayed on the first tab; and
   switching from the first tab to the second tab in the information presentation interface for display when a trigger signal corresponding to the label of the second tab is received.

4. The method according to claim 2, wherein the information presentation interface comprises at least two pieces of interactive recommended information in a collapsed display state, and the method further comprises:
   switching from the function entry interface to the information presentation interface, an expansion control for the at least two pieces of interactive recommended information being displayed on the information presentation interface; and
   displaying the at least two pieces of interactive recommended information on the information presentation interface in the information flow form when a trigger signal corresponding to the expansion control is received.

5. The method according to claim 1, wherein
   account information of the second account is displayed at a recommendation source location of at least one piece of interactive recommended information.

6. The method according to claim 1, wherein a sorting position of the interactive recommended information is in a positive correlation with a social relationship index, and the social relationship index is an index used for measuring the social relationship between the first account and the second account;
   the social relationship index is obtained through calculation according to at least two social parameters; and
   the at least two social parameters comprise at least two of interaction frequency, propagation influence in a social relationship chain or popularity in a circle.

7. The method according to claim 1, wherein an interactive message display area of the interactive recommended information is further displayed in the information presentation interface, and the interactive message display area is a partial area used for displaying an interactive message for the interactive recommended information in the information presentation interface; and
   the method further comprises:
   receiving an interactive operation in the interactive message display area; and
   generating the interactive message for the interactive recommended information according to the interactive operation, the interactive message comprising at least one of a like message, a comment message or a comment reply message.

8. The method according to claim 1, wherein the interactive recommended information comprises first recommended information; and
   after the displaying an information presentation interface, the method further comprises:
   receiving a new interactive message transmitted by a server for the first recommended information, the new interactive message comprising at least one of a like message, a comment message or a comment reply message of the second account for the first recommended information after a previous push;
   displaying a notification of the new interactive message on the information presentation interface; and
   displaying an interactive message display area of the first recommended information according to the new interactive message after a second trigger signal for the notification is received, the first recommended information being recommended information for which the first account has generated a historical interactive message, or the first recommended information being recommended information for which both the first account and the second account have generated historical interactive messages.

9. The method according to claim 8, wherein the displaying an interactive message display area of the first recommended information according to the new interactive message further comprises:
  determining, when a quantity of the historical interactive messages and new interactive messages for the first recommended information is greater than a preset quantity, target interactive messages whose quantity exceeds the preset quantity in the historical interactive messages and the new interactive messages, and displaying the target interactive messages in the collapsed display state in the interactive message display area; and
  switching the target interactive message from the collapsed display state to an expanded display state in the interactive message display area when an expansion signal for the target interactive message is received.

10. The method according to claim 1, wherein the interactive recommended information further comprises second recommended information for which the first account generates an interactive message in another interface; and the another interface comprises at least one of the following interfaces:
  the another interface is an interface other than the information presentation interface in the application program; or another interface is an interface in another application program that has an exchange relationship with the application program.

11. The method according to claim 10, further comprising:
  displaying, when a quantity of pieces of second recommended information exceeds a preset quantity, target second recommended information whose quantity of pieces exceeds the preset quantity in the collapsed display state in the information presentation interface; and
  switching the target second recommended information from the collapsed display state to an expanded display state in the information presentation interface when an expansion signal for the target second recommended information is received.

12. The method according to claim 1, wherein the recommended information flow further comprises third recommended information that is set to be read later in another interface by the first account; and
  another interface comprises at least one of the following interfaces:
  another interface is an interface other than the information presentation interface in the application program; or another interface is an interface in another application program that has an exchange relationship with the application program.

13. The method according to claim 1, wherein the interactive recommended information comprises at least two pieces of fourth recommended information for which the same second account generates interactive messages within preset duration; and
  the method further comprises:
  collapsing interactive recommended information from the same second account for display in the information presentation interface;
  displaying target fourth recommended information in the at least two pieces of fourth recommended information in a normal display state in the information presentation interface, and displaying the other fourth recommended information other than the target fourth recommended information in the collapsed display state; and
  switching the other fourth recommended information from the collapsed display state to an expanded display state in the information presentation interface when an expansion signal for the other fourth recommended information is received.

14. The method according to claim 13, wherein the switching the other fourth recommended information from the collapsed display state to an expanded display state comprises:
  switching, when a quantity of pieces of the other fourth recommended information in the collapsed display state exceeds a one-time expansion threshold n, n pieces of the latest fourth recommended information from the collapsed display state to the expanded display state, n being a positive integer.

15. The method according to claim 12, wherein the interactive recommended information comprises at least two pieces of fifth recommended information for which the same second account generates interactive messages but whose information quality is worse than a quality condition; and
  the method further comprises:
  displaying target fifth recommended information in the at least two pieces of fifth recommended information in a normal display state in the information presentation interface, and displaying the other fifth recommended information other than the target fifth recommended information in the collapsed display state;
  switching the other fifth recommended information from the collapsed display state to an expanded display state in the information presentation interface when an expansion signal for the other fifth recommended information is received; and
  switching, when a quantity of pieces of the other fifth recommended information in the collapsed display state exceeds a one-time expansion threshold n, n pieces of the latest fifth recommended information from the collapsed display state to the expanded display state, n being a positive integer.

16. A terminal, comprising a memory and a processor, the memory storing computer-readable instructions, the computer-readable instructions, when executed by the processor, causing the processor to perform a plurality of operations comprising:
  starting an application program according to a start operation, a first account being logged in in the application program;
  obtaining a recommended information flow for the first account, recommended information in the recommended information flow including at least one piece of interactive recommended information, the interactive recommended information being information for which a second account generates an interactive message, the first account and the second account having a social relationship; and
  displaying an information presentation interface, the information presentation interface comprising the recommended information displayed in an information flow form,
  wherein:
  the recommended information flow comprises a piece of re-recommended information that has been historically recommended and meets a re-recommendation condition;
  the re-recommendation condition comprises at least one of: m new interactive messages that have been generated, by one or more accounts having a social relationship with the first account, since the piece of information was previously recommended, or new interactive messages of k second accounts have been generated since the piece of information was previously recommended, both m and k being positive integers; and the method further comprises: displaying the piece of re-recommended information and a re-recommendation reason in the information display interface.

17. The terminal according to claim 16, wherein before the displaying an information presentation interface, the plurality of operations further comprises:

displaying a function entry interface, a function entry control of the information presentation interface being displayed on the function entry interface, a new information notification being displayed on the function entry control; and the displaying an information presentation interface comprises:

jumping from the function entry interface to the information presentation interface for display when a first trigger signal for the function entry control is received.

18. The terminal according to claim 17, wherein the information presentation interface comprises a first tab and a second tab, and either of the first tab and the second tab is used for displaying the interactive recommended information; and the jumping from the function entry interface to the information presentation interface for display comprises:

jumping from the function entry interface to the first tab of the information presentation interface for display, a label of the second tab being further displayed on the first tab; and switching from the first tab to the second tab in the information presentation interface for display when a trigger signal corresponding to the label of the second tab is received.

19. The terminal according to claim 17, wherein the information presentation interface comprises at least two pieces of interactive recommended information in a collapsed display state, and the plurality of operations further comprises:

switching from the function entry interface to the information presentation interface, an expansion control for the at least two pieces of interactive recommended information being displayed on the information presentation interface; and displaying the at least two pieces of interactive recommended information on the information presentation interface in the information flow form when a trigger signal corresponding to the expansion control is received.

20. One or more non-transitory storage media storing computer-readable instructions, the computer-readable instructions, when executed by one or more processors, causing the one or more processors to perform a plurality of operations comprising:

starting an application program according to a start operation, a first account being logged in in the application program;

obtaining a recommended information flow for the first account, recommended information in the recommended information flow including at least one piece of interactive recommended information, the interactive recommended information being information for which a second account generates an interactive message, the first account and the second account having a social relationship; and displaying an information presentation interface, the information presentation interface comprising the recommended information displayed in an information flow form, wherein:

the recommended information flow comprises a piece of re-recommended information that has been historically recommended and meets a re-recommendation condition;

the re-recommendation condition comprises at least one of: m new interactive messages that have been generated, by one or more accounts having a social relationship with the first account, since the piece of information was previously recommended, or new interactive messages of k second accounts have been generated since the piece of information was previously recommended, both m and k being positive integers; and the method further comprises: displaying the piece of re-recommended information and a re-recommendation reason in the information display interface.

* * * * *